United States Patent [19]

Cole et al.

[11] E Re. 28,459

[45] Reissued July 1, 1975

[54] TRANSPIRATION DRYING AND EMBOSSING OF WET PAPER WEBS

[75] Inventors: Richard I. Cole, Springfield, Pa.; Donald E. Holcroft, Claymont; Edward A. Milligan, Wilmington, both of Del.; Samuel Greenhalgh, Philadelphia, Pa.

[73] Assignee: Scott Paper Company, Philadelphia, Pa.

[22] Filed: Dec. 7, 1972

[21] Appl. No.: 313,158

Related U.S. Patent Documents

Reissue of:

[64] Patent No.: 3,432,936
Issued: Mar. 18, 1969
Appl. No.: 649,776
Filed: May 31, 1967

U.S. Applications:

[63] Continuation-in-part of Ser. No. 555,748, June 7, 1966, abandoned.

[52] U.S. Cl. ..... 34/6; 162/115

[51] Int. Cl. ..... F26b 3/06

[58] Field of Search ..... 34/6, 16, 18, 41, 92; 162/113, 114, 115

[56] References Cited

UNITED STATES PATENTS

| | | | |
|---|---|---|---|
| 2,344,686 | 3/1944 | Fanselow | 34/18 |
| 2,862,251 | 12/1958 | Kalwaites | 162/114 X |
| 3,081,514 | 3/1963 | Griswold | 162/114 X |
| 3,320,675 | 5/1967 | Chaikin et al. | 34/16 |

*Primary Examiner*—John J. Camby
*Attorney, Agent, or Firm*—R. Duke Vickrey; W. J. Foley

[57] ABSTRACT

A method and apparatus are disclosed for drying a wet paper web by passing gaseous fluid such as air which may be at an elevated temperature, up to about 1500° F., through the web while it is supported upon a foraminous surface. The arrangement of the apparatus whereby the heated air passes through the web prior to passing through the foraminous surface enables the use of higher temperatures than heretofore possible. A method and apparatus for embossing the wet paper webs during drying are also disclosed along with the new products formed by the method and apparatus. The embossing is accomplished in one of several different ways, which involve rearranging the fibers in the web before the web is dried and interfiber bonds are formed. The rearranging may be done by a fluid pressure differential through the web while it is supported on a contoured foraminous surface such as a woven wire, by fluid flow at high speeds through the web, or by mechanical pressure against the web. In some embodiments, holes may be formed in the web during embossing by subjecting the web to sufficient fiber rearrangement in spaced localized areas to form breaks or create apertures. Paper web products are formed which have raised contoured portions in which substantially all of the bonds between fibers are intact so that the raised contoured portions possess substantial stiffness and permanency.

37 Claims, 16 Drawing Figures

INVENTORS.
RICHARD I. COLE
DONALD E. HOLCROFT
SAMUEL GREENHALGH
EDWARD A. MILLIGAN
BY Stanton T. Hadley
ATTORNEY.

INVENTORS.
RICHARD I. COLE
DONALD E. HOLCROFT
SAMUEL GREENHALGH
EDWARD A. MILLIGAN

BY Stanton T. Hadley
ATTORNEY

INVENTORS.
RICHARD I. COLE
DONALD E. HOLCROFT
SAMUEL GREENHALGH
EDWARD A. MILLIGAN
BY Stanton V. Bradley
ATTORNEY.

INVENTORS.
RICHARD I. COLE
DONALD E. HOLCROFT
SAMUEL GREENHALGH
EDWARD A. MILLIGAN

BY Stanton T. Kadley
ATTORNEY

INVENTORS.
RICHARD I. COLE
DONALD E. HOLCROFT
SAMUEL GREENHALGH
EDWARD A. MILLIGAN
BY Stanton T. Hadley
ATTORNEY INVENTORS.
RICHARD T. COLE
DONALD E. HOLCROFT
SAMUEL GREENHALGH
EDWARD A. MILLIGAN
BY Stanton T. Hadley
ATTORNEY.

INVENTORS.
RICHARD I. COLE
DONALD E. HOLCROFT
SAMUEL GREENHALGH
EDWARD A. MILLIGAN
BY Stanton T. Kelley
ATTORNEY.

TRANSPIRATION DRYING AND EMBOSSING OF WET PAPER WEBS

Matter enclosed in heavy brackets [ ] appears in the original patent but forms no part of this reissue specification; matter printed in italics indicates the additions made by reissue.

---

This application is a continuation-in-part of our previous application, Ser. No. 555,748, filed June 7, 1966, now abandoned, entitled Transpiration Drying and Embossing of Wet Paper Webs.

BACKGROUND OF THE INVENTION

1. Field of the Invention

This invention relates to the treatment of wet paper webs and, more particularly, to a new and improved method and apparatus for drying wet paper webs, which drying is alternatively accompanied by embossing or by another related fiber rearranging treatment, and to the products formed thereby.

2. Description of the Prior Art

Wet paper webs are normally dried by mechanically pressing them and by placing them in contact with a heated surface. On a conventional papermaking machine such drying occurs in a drying section comprising one or more rotatably mounted drum dryers over which the web is entrained. In many instances, the web is creped from one of the rotatable drum dryers as opposed to leaving it as a flat sheet. The web is then removed from a large drum dryer called a Yankee dryer, at a point angularly displaced from the point where it is pressed onto the dryer, normally by creping it with a creping doctor blade. In some instances, after leaving the Yankee dryer, the paper web is then fed into an afterdryer section which comprises a plurality of rotatably mounted, steam-heated, drum dryers over which the paper web is entrained in partial wrapping engagement therewith. Commercial paper machines normally utilize one or more of the above-described drying systems.

It is well-known that such apparatus is extremely complicated and expensive, requiring exceptionally high capital investment. Furthermore, maintenance costs of Yankee type drum dryers are quite high. The cost of supplying steam to these multiple drum dryers for heating the dryers is quite high and the means for distributing the steam to each drum dryer is quite complex and expensive. In addition, the foregoing apparatus does not inherently maintain cross-machine drying uniformity as it is difficult to maintain uniform drum surface temperatures and humidity throughout the apparatus.

More efficient and less costly schemes for the drying of wet paper webs have been investigated in the past but have largely proved unacceptable and uneconomical. It has long been recognized that a system of drying wet paper webs uniformly at high drying rates would be desirable so that the drying function could be performed on relatively inexpensive equipment occupying a relatively small floor space.

It is well-known that the drying rate of a wet fibrous web is partly a function of the amount of moisture carried in the web, normally expressed in terms of percent by weight of the web, and the amount of heat transferred to the moisture in a given time in order to cause it to vaporize. A well-known principle of thermodynamics is that the heat transfer from a moving fluid such as a gas to a surface increases with the velocity of the fluid over the surface. Conventional drying equipment has been designed with the intention that the above principles would be applied to advantage, but it has been discovered that the new methods of the invention, for drying wet paper webs, more advantageously apply such principles.

For example, dryer hoods are presently commonly employed in connection with Yankee dryers and other types of rotary drum dryers mentioned above. These hoods are provided with means for introducing drying air under pressure and at certain velocities and with means for removing the air at various points about the hood. The air is caused to sweep one exposed surface of the wet web as it progresses around the dryer. Vapors having a high moisture content are exhausted from the hood and low humidity drying air introduced into the hood and directed toward the surface. In other instances, methods of drying paper webs by fluidized beds have been attempted and have been largely unsuccessful.

In each of the above instances, contact of the drying air with the web occurs only at the surface and very little movement or contact results between the drying gas and the moisture. Furthermore, heat transfer depends upon the thermal conductivity of the moisture, the fibers in the web, and, in the case of a Yankee dryer, the thermal conductivity of the dryer shell.

It is a principal object of the present invention to provide a new and improved method and apparatus for drying wet paper webs.

It is an additional object of the invention to provide a new method and apparatus for drying wet paper webs by transpiration of gaseous fluids through the webs.

BRIEF SUMMARY OF THE INVENTION

The method of the invention involves the use of a moving gaseous fluid, generally air at an elevated temperature, flowing transversely through the web, directly in contact initially with the moisture carried in the interstices and pores of the web and, finally, in contact with substantially all of the fibers in the web. In accordance with the invention, movement of the gaseous fluid is primarily through the web from one facing surface to the other resulting in contact by the moving gaseous fluid of substantially all of the fibers forming the web. It has been found that the above process of drying webs by transpiration of a gaseous fluid through a web results in a very rapid rate of heat transfer from the gaseous fluid to the moisture on the web causing it to quickly attain its heat of vaporization. The gaseous fluid also provides a means for removing the vaporized moisture from the web to a remote point where it can be exhausted, condensed for reuse, or otherwise disposed of.

As further distinguished from previously employed drying processes, the method of the invention makes possible the removal of moisture from a wet by mechanical separation. It will readily be appreciated that this could not be accomplished by prior art drying methods where gaseous fluid was not passed through the web. In accordance with the invention, large amounts of moisture are rapidly removed from a wet paper web by the gaseous fluid passing through the web and generally between and around the fibers thereof.

The following example clearly illustrates the increase in drying rate which is achieved by the method and apparatus of the invention. A conventional afterdryer section comprising five steam heated drying cans will dry a creped wet paper web having a basis weight of 13.4 pounds per 2,880 ft.$^2$ and a water content of 35% by weight while the web is traveling at 2,000 feet per minute. The web is dried to the point where it contains 5% water by weight. In that case, drying occurs over a length of web travel of about 58 feet. At any given time, 47 feet of the web are actually in contact with the surface of the drying cans and 11 feet of the web are in the draws between the drying cans.

Apparatus capable of performing the method of the invention, wherein a pressure drop of 10 inches of water is created through the web and air at a temperature of 600° F. is introduced to one surface of the web, accomplishes drying of the same web at the same speed described above in a length of web travel of approximately 11.5 feet. If a pressure drop of 30 inches of water through the web is employed with air at 600° F., the same degree of drying can be achieved in a length of web travel of about 7.25 feet.

The overall efficiency of the above-described process has been found to be dependent in part upon the velocity of the gaseous fluid through the web. In the case of wet paper webs which have been recently formed, substantially no firm interfiber bonds have been established. Therefore, these transpiration velocities and the corresponding pressure drops through the web must be carefully controlled to avoid web breakage where this is undesirable.

In the course of establishing feasibility of the above process, new and improved web handling and drying apparatus was contrived which enables the recently formed web to withstand the pressure drops involved and which makes it possible to dry the paper webs by transpiration of a gaseous fluid through the webs. The apparatus of the invention comprises, as a drying unit for a papermaking machine, a movable endless foraminous surface upon which a paper web to be dried is fed into engagement therewith. Hood means are disposed adjacent at least a portion of the foraminous surface contacted by the paper web and adapted to substantially enclose this portion. Supply means are provided for introducing gaseous fluid under pressure into the hood means and vacuum bias means are disposed adjacent the foraminous surface opposite the portion of the web enclosed by the hood means. The vacuum bias means are adapted to draw gaseous fluid through the web while it is in contact with and supported by the foraminous surface in order to effect drying of the web.

By passing gaseous fluid through the wet paper web prior to passing it through the foraminous surface in contact with the web, it has been found possible to utilize gaseous fluid at an elevated temperature without deleteriously affecting the web. For example, air up to 1500° F. can be utilized for drying the wet paper webs without destroying the physical properties of the web.

To anyone familiar with conventional web drying equipment and techniques employed in papermaking, the following comparative examples will more clearly illustrate the outstanding advance which the present invention has made possible. In a typical arrangement in a conventional papermaking machine, a sheet of tissue grade paper having a basis weight of approximately 13 pounds per 2,880 square feet, the paper is partially dried on a Yankee dryer and is creped by removing it from a Yankee dryer with a doctor blade. The creped tissue paper is then fed into an afterdrying section. At the point of introduction in the afterdryer section, the web consists of approximately 65% pulp and 35% water by weight. In the afterdryer section, the web is entrained in partial wrapping engagement over five or more steam heated drying cans on which the average evaporation rate typically ranges from about 2 to about 5 pounds of water per hour per square foot of circumferential area. The sheet issuing from the afterdryer normally comprises 95% pulp and 5% water by weight. The above-described afterdryer section, including the drying cans, typically comprises 25 feet or more of the total length of the paper machine. Furthermore, the capital investment for such afterdrying equipment is quite substantial.

The same web can be removed from the Yankee dryer and dried on a single transpiration dryer of the invention in accordance with the method of the invention to the point where it comprises 95% pulp and 5% water by weight. In a typical situation, the transpiration dryer required to perform this task costs substantially less than the afterdrying equipment as described above and occupies only about 8 feet of the total length of the paper machine. Rates of drying or water removal of up to about 60 pounds of water per hour per square foot of circumferential area are possible depending upon the nature of the web being dried and the parameters of the drying process.

As will become apparent from subsequent description, the transpiration drying apparatus of the present invention may be employed at other positions in a paper machine and to treat a web having vastly different moisture characteristics. Another very important advantage of the transpiration drying process and apparatus of the invention is the elimination of the elaborate procedures and apparatus previously employed to insure that an even moisture profile is present in the finally dried web. This even moisture profile was difficult to achieve with the steam heated drying cans and Yankee dryers previously employed.

A further discovery made in conjunction with the above-described method and apparatus of the invention is that by embossing or otherwise performing a related texturizing treatment on the paper web prior to drying, a new and improved paper web product is formed having properties distinguishing it from webs so formed or treated by conventional processes. Thus, it was quite suprising to discover that the pressure differentials created in the transpiration drying apparatus and utilized advantageously for the transpiration drying process can be employed in combination and cooperation with certain modifications or provisions in the web supporting apparatus to emboss or otherwise texturize the recently formed wet paper sheet. Alternatively, slight additions or modifications to the apparatus have been discovered which make possible the accomplishment of this new process and the formation of these new products. These modifications involve means to apply pressure to portions of the wet web to cause the fibers to locally shift their relative positions in the desired manner.

The most advantageous form of apparatus for causing fiber rearrangement or a shift in the relative positions of fibers in the web to emboss or texturize it includes means for creating a higher pressure differential through the wet web carried on the foraminous surface initially prior to movement of the web through the final drying zone. In a specific embodiment, the apparatus includes means for directing a gaseous fluid such as air or steam at high velocity toward the wet paper web while it is supported on a foraminous surface backed by a high vacuum box adapted to receive the gaseous fluid passing through the web and to enhance its flow through the web.

For reasons that will be presented subsequently, it has been discovered that by embossing, texturizing or otherwise altering the relationship of the fibers comprising the sheet to one another while the web is wet and causing the fibers to retain their new positions until drying of the web has occurred, new products are formed which have substantially different properties attributed to them by this particular embossing or texturizing treatment. That is, these webs have properties which are different in many respects from the properties which would be found in a paper sheet or web which was dried by normal techniques and subsequently embossed or mechanically treated.

It has been discovered that many different types of embossing or texturizing may be performed. In one typical situation where a plurality of projections are formed in the sheet by pressure from the opposite side, the projections formed in the sheet of the present invention demonstrate a greatly increased stiffness and permanency in the sheet than is the case with normal mechanical embossings. These properties are desirable in certain types of paper products, such as wipers, into which such paper may advantageously be converted after formation. In addition, it is possible by means of the invention to form a foraminous sheet in which holes are present at predetermined and desired positions. Obviously, there are many applications for a product of this configuration with these properties. Thus, it is a further object and advantage of the present invention to provide a new and improved method and apparatus for embossing a paper web.

It is a still further object and advantage of the invention to provide a method and apparatus for forming a new and improved paper product, distinguished by novel physical properties caused by embossing or texturizing immediately subsequent to sheet formation and immediately prior to or during sheet drying.

Additional objects and advantages of the present invention will become apparent from the following detailed description thereof, when read in conjunction with the accompanying drawings.

DESCRIPTION OF THE PREFERRED EMBODIMENTS

Figure 1:
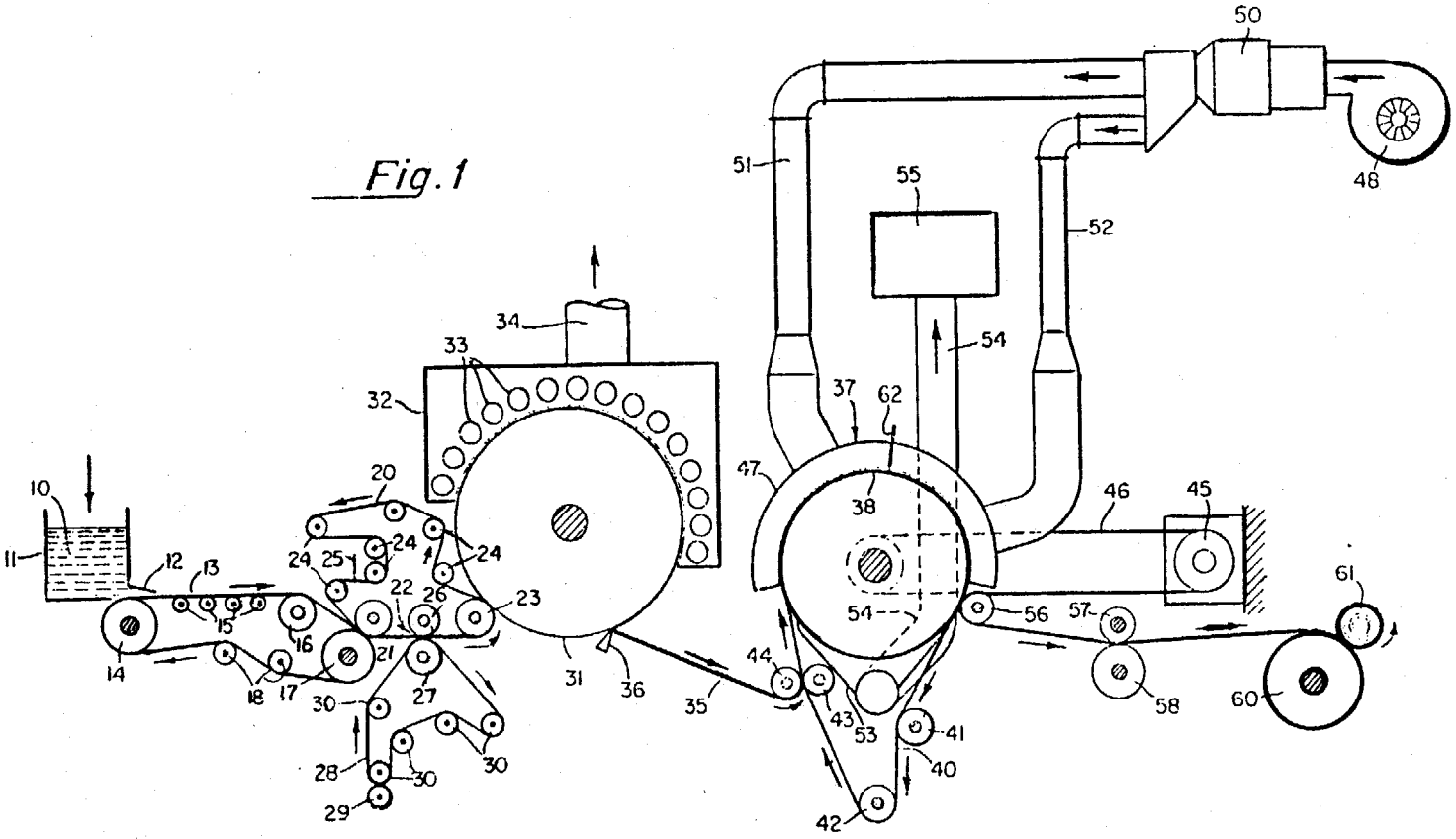
FIG. 1 is a schematic elevation view of a paper machine incorporating a transpiration dryer of the invention and capable of performing the method of the invention.

In the method of the invention, a wet web of paper fibers is fed into contact with a foraminous supporting surface and advanced in the supported condition on the foraminous supporting surface into a drying zone. The feature of supporting the web during drying is extremely important since a wet paper web, unlike many other webs, has very little bonding between the fibers thereof and generally comprises only randomly interwoven paper fibers held together by mechanical entanglement. It is well-known to those skilled in the art that bonds are created in a paper web primarily during the drying thereof, although the exact physical and chemical mechanism causing bonding is not clearly understood. In fact, one of the reasons transpiration drying of wet paper webs has not been employed in the past is believed to be due to the fact that it was not considered possible to adequately support a wet paper web while passing the required amounts of gaseous fluids through it to remove moisture therein in a thorough drying operation.

Within the drying zone, the supported web is contacted on its exposed surface with a gaseous fluid such as air under pressure so that a pressure drop is created through the web. In this manner, flow of air through the web and between the fibers comprising the web is effected. This air flow is preferably of sufficient velocity to physically sweep entrained moisture out of the web and through the foraminous supporting surface while also serving to evaporate moisture on and within the fibers. After the desired amount of moisture is removed from the web the web is advanced out of the drying zone and withdrawn from the foraminous supporting surface. In accordance with the method of the invention, a vacuum bias is preferably applied to the side of the foraminous supporting surface opposite the side contacting the web to increase the pressure drop and air flow through the web and to assist drying and moisture removal. It is also a preferred feature of the method of the invention to initially heat the gaseous fluid in order to assist the evaporative drying and to cause the moisture in the web to attain its heat of evaporization. In this regard, it has been found preferable to employ air at a temperature of from about 300° F. to about 850° F. although it is possible to use air having a temperature varying from ambient to as high as about 1500° F., without damaging the paper web.

One feature of the method and, correspondingly, of the apparatus of the invention is the ability to utilize air for drying which is at a temperature higher than that normally thought to be tolerable without deleteriously affecting the physical properties of the resulting paper web. It is believed to be due to the direction of movement of the gaseous fluid through the web and the foraminous supporting surface. By passing the heated air through the web initially, heat is transferred to the moisture in the web which vaporizes. Very little heat is transferred to the actual fibers themselves because of the short period during which they are subjected to hot air. Also, the heated air is cooled considerably before contacting the foraminous carrying surface and does not, therefore, raise the temperature of that surface anywhere near the initial temperature of the heated gaseous fluid or air. Since the foraminous carrying surface intimately contacts the web, the above fact is important because the web could be damaged by a carrying surface at too high a temperature.

Another benefit derived from the preferred direction of movement of the gaseous fluid is that, by initially passing through the web, it is evenly distributed in rate of flow, through the web. Were it to first pass through an adjacent foraminous surface, the air flow would be greater through some spaced localized areas of the web adjacent open areas of the foraminous surface than it would be through other areas of the web adjacent closed areas of the foraminous surface, causing an uneven moisture profile in the web resulting from uneven drying rates. This makes the proportion of open area in the foraminous carrying surface less critical in apparatus of the invention than would otherwise be the case.

The method of the present invention is a drying process operable on a wet web which, in some instances, is creped on a Yankee dryer or other apparatus and, in other instances, is uncreped and dried by the method of the invention while it is supported on the carrying web used during formation. In still other instances, the web is formed on a first carrying member and transferred to a second foraminous carrying member upon which it is supported and dried according to the invention. The method of the invention also is significantly different from prior art processes described above since it involves the passage of a gaseous fluid under pressure through the supported web. This causes large amounts of gaseous fluid to pass between the fibers forming the web thereby both physically removing entrained moisture as well as causing evaporative action to occur.

It has been found that the physical parameters of the method of the invention may be varied quite widely to achieve good results with a wide variety of paper webs. The most rapid rates of drying by the method of the invention are experienced with tissue and towel grades having a basis weight of from about 6 pounds per 2,880 feet to about 30 pounds per 2,880 feet and higher. These grades are more porous and allow the free passage of heated air through them.

The pressures and air flow rates which should be employed to achieve the desired results depend to a large extent on the nature of the supporting surface and on the type and condition of the fibers employed in the web. Papers made of long fibers or short fibers or mixtures thereof can be dried successfully according to this method. The parameters may vary slightly for each type, however. Other factors affecting these parameters are the degree of freeness of the pulp determined by the beating or defibering operation and the refining operation. Wet webs having a moisture content of up to about 90% by weight and even higher can be dried successfully to remove substantially all of the moisture therein.

The gaseous fluid contemplated for the method can be of many different types. However, because of economy, air is by far the preferred gaseous fluid. It is preferably heated to more readily cause evaporization and to transfer more heat of vaporization. Wet paper webs will withstand surprisingly high temperatures without bad effects. This may be due to the cooling of the fibers by the removal of the heat to the moisture in its vaporization.

The following relationship has been found to exist between various parameters involved in the method of the invention.

$$t = \frac{\frac{L}{S} W h_{fg}}{3880 \mathring{m} C_p (T_i - T_b)}$$

t = Drying time in seconds
L = Weight of liquid in web being dried
S = Weight of solid in web being dried
W = Basis weight of web being dried in pounds per 2880 square feet
$h_{fg}$ = Heat of vaporization
$A_s$ = Area of web being dried
= Dimensionless parameter relating to drying process efficiency (approximately equal to 0.45)
$\mathring{m}$ = Mass flow rate of drying gas
$C_p$ = Specific heat of drying gas
$T_i$ = Temperature of incoming gas
$T_b$ = Boiling temperature of liquid in web The above expression indicates that the drying rate is strongly dependent on the mass flow rate and the temperature of the gaseous fluid. This is also illustrated by the following Table I presenting data taken during the drying of paper webs, having a basis weight of 12 pounds per 2,880 square feet, in accordance with the method of the invention.

TABLE I

| Run No. | $T_i$, (°F.) | $\mathring{m}/A_s$ (lbs/sec. ft.$^2$) | Moisture content (lbs. water/lbs.paper) | | Drying time (seconds) | Pressure drop through paper, inches water (p.s.i.) |
|---|---|---|---|---|---|---|
| | | | Wet web | Dry web | | |
| 1 | 585 | .0815 | 1.33 | 0.03 | 1.36 | 6.0(.216) |
| 2 | 578 | .0946 | 1.31 | 0.04 | 1.20 | 6.9(.249) |
| 3 | 305 | .1015 | 1.45 | 0.07 | 2.66 | 6.4(.231) |
| 4 | 840 | .340 | 1.52 | 0.57 | .174 | 18.64(.67) |

In the above drying operation, the paper was supported during its passage through the drying zone upon a fiberglas screen, 18 by 18 mesh, weighing 9 ounces per square yard. Surprisingly, in run number 2, an evaporative rate of 10 pounds of water per square foot per hour was achieved with a pressure drop of only 7 inches of water through the web. From this it can be seen that evaporative rates up to 60 pounds of water per square foot per hour and even higher can be achieved with only relatively slight increases in the mass flow rate and/or the temperature of the drying air. It has been determined that the advantages of the invention can be achieved and realized, when drying tissue and towelling grades of paper, by maintaining the mass flow rate within a range which creates a pressure drop of between about 5 and about 30 inches of water, and by maintaining the initial temperature of the drying air between about 300 and about 800° F.

An alternative method of the invention involves the method described above and, in addition, the step of forcing the fibers in portions of the wet web covering openings in the foraminous supporting surface to shift their positions relative to one another. As a result, these web portions are forced generally toward and into the openings. Thus, the web portions are moved at least partially out of the plane of the web and into the plane of the foraminous surface. Thus, one method of the invention includes an embossing operation in which the fluid pressure employed for transpiration drying is also employed to perform a type of embossing or related texturing treatment. In some instances, this step is performed prior to the introduction of the supported web into a normal drying zone and, in that instance, a generally higher fluid pressure is applied to the web to cause the fibers to initially shift their position relative to one another. Alternatively, a generally higher vacuum bias is momentarily employed to cause a similar deformation prior to drying.

The most preferred method of deforming or embossing the web comprises simultaneously directing a stream of gaseous fluid at high velocity against successive transverse segments of the web as it is carried on the foraminous supporting surface while applying a high vacuum to the opposite side of the web to receive and remove substantially all of the high velocity gaseous fluid directed against the web which passes through the web either prior to or at the start of the drying operation. Preferably, the web is supported on an undulating surface such as that of a foraminous woven wire cloth. This method of embossing enables the web to be positively shaped into the desired configuration while deformable and wet during only a very short distance of web travel.

The additional pressure or vacuum bias impressed on the web depends largely upon the nature of the supporting surface, the size of the openings therein, and the length and condition of the fibers comprising the web. For a web having longer fibers, more force must be exerted. Similarly, if supported on a surface with smaller openings, more force must be exerted.

It is preferable, for reasons which will subsequently be pointed out, for web deformation to occur and to be substantially completed prior to substantial drying of the web. When drying occurs, firm, strong bonds are created between the fibers in the paper web which will prevent subsequent web deformation or movement of the fibers by fluid pressure as contemplated by the invention.

Although one embodiment of the invention contemplates the use of fluid pressure to accomplish embossing and, primarily, by pressure of the same fluids which are used in drying, it is also possible to mechanically emboss the wet web into the openings or apertures in the supporting surface prior to the introduction of the wet web into the drying zones, or within the drying zone. In this instance, the fibers in portions of the wet web covering openings in the foraminous surface are forced to shift their positions relative to one another by pressure of a resilient member which has a yieldable surface allowing the application of pressure over the entire surface of the web. The nature of various surfaces and materials useful for this purpose and their construction will be described.

The above-described methods of the invention enable the production of an embossed paper product which has characteristics distinguishing it from dry embossed paper products formed from prior art methods. As was pointed out above, by embossing or deforming the web prior to drying, substantially no bonds are created between the fiber until the desired shaft has been attained. Upon subsequent drying, the embossed sheet exhibits a much greater resilience and ability to retain its embossed configuration and the embossed portions have a resistance to deformation not found in dry embossed paper products which are embossed after creation of the bonds. This increase in resilience and resistance to compressive deformation is due to the fact that substantially all of the bonds formed between fibers remain intact even in the deformed areas. This is different than in the case of mechanical dry embossing where many of the bonds previously formed between fibers are broken during embossing.

Figure 14:
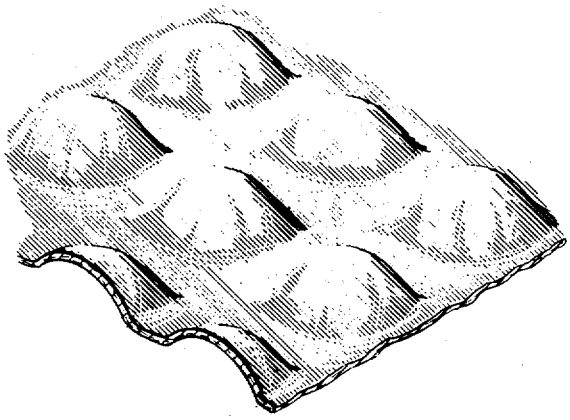
FIG. 14 is a perspective view of a typical product formed in accordance with the invention.
Figure 15:
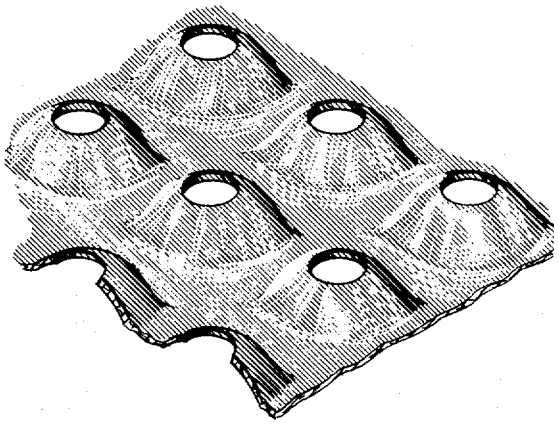
FIG. 15 is a perspective view of an alternative embodiment of a product formed in accordance with the invention.

With the above-described processes it is possible to form new paper products, that is, embossed paper products having regularly spaced portions thereof extending beyond at least one of two planes defining the space occupied by generally the flat sheet or web, these portions representing raised contoured portions of the sheet having substantially improved stiffness and permanency. By increasing the fluid pressure exerted on the web during embossing in accordance with the method of the invention, an even more distinctive product can be formed wherein the raised contoured portions of the sheet have openings at their outermost end and, therefore, terminate at their outermost extremities in an annular edge. These are shown in FIGS. 14 and 15.

Products such as those described above have many new uses. For example, rough abrasive wiping materials may be created by these types of paper webs. The holes or apertures in the web provide a greater porosity in the web while allowing web strength and basis weight to be sufficiently high to avoid deterioration and distintegration of the wiper during use.

Although, as indicated above, the specific form of the apparatus will vary depending upon many factors, Tables II and III present some data on various combinations of foraminous carrying members, wet paper webs and ranges of pressure drops which have been employed in practicing the method of the invention.

TABLE II

| Screen No. | Type of weave/material | Number of warp wires per inch | Diameter of warp wires (in.) | Number of shute wires per inch | Diameter of shute wires (in.) |
|---|---|---|---|---|---|
| 1 | Plain Dutch twill/stainless steel. | 24 | .014 | 56 | .010 |
| 2 | Twill/stainless steel | 38 | .011 | 60 | .009 |
| 3 | Plain or double crimped/ phosphor bronze | 14 | .030 | 11 | .015 |
| 4 | Plain or double crimped/ stainless steel. | 10 | .032 | 10 | .031 |
| 5 | do. | 6 | .065 | 6 | .065 |

TABLE III

| Screen used during run | Open area of screen (percent) | Basis weight (pounds per ream) | Minimum pressure drop (p.s.i.) | Maximum pressure drop (p.s.i.) |
|---|---|---|---|---|
| 1 | 29.2 | 12.6 uncreped | 3.5 | 10.0 |
| | | 12.8 creped | 3.5 | 10.0 |
| | | — | — | — |
| 2 | 26.8 | 12.6 uncreped | 2.0 | 10.0 |
| | | 12.8 creped | 3.5 | 10.0 |
| | | 30.2 creped | 5.0 | 10.0 |
| 3 | 48.5 | — | — | — |
| | | 12.8 creped | 0.5 | 6.5 |
| | | — | — | — |
| 4 | 47 | — | — | — |
| | | 12.8 creped | 0.5 | 4.0 |
| | | 30.2 creped | 2.0 | 10.0 |
| 5 | 37 | — | — | — |
| | | 12.8 creped | 0.5 | 2.0 |
| | | 30.2 creped | 0.5 | 10.0 |

It is believed that a brief description of the equipment typically associated with the dryer in performing the method of the invention will facilitate a better understanding of both the method of the invention and the advantages and features of the transpiration dryer apparatus. With that view in mind, the following description of FIG. 1 is presented.

Referring now to FIG. 1 of the drawings, there is shown one type of conventional Fourdrinier papermaking machine of the double-felt type in which paper furnish 10 is fed from a head box 11 through a slice 12 onto the substantially horizontal surface of a Fourdrinier wire 13 through which water is withdrawn and upon which web formation takes place. Wire 13 is entrained around a breast roll 14 and over a plurality of table rolls 15 to a wire turning roll 16. It is then fed around a lower couch roll 17 and around to other guide rolls 18 back to breast roll 14. One or more of the above-described rolls is driven and propels the Fourdrinier wire 13 through the desired path so that the upper surface or flight moves from the breast roll 14 to the lower couch roll 17 and returns along the bottom. In addition, one or more vacuum boxes, deflectors, and hydrofoils (not shown) may be employed between table rolls 15 to assist in the removal of water from the web during its formation.

The wet web formed on the upper surface of Fourdrinier wire 13 is transferred to a pickup felt 20, pressed into engagement with the web on wire 13 by means of an upper couch roll 21. The pickup felt 20 meeting wire 13 moves in the same direction as the wire 13, as indicated in FIG. 1, and at substantially the same speed. Pickup felt 20 carrying the newly formed web is advanced through the nip of a press assembly, indicated generally by reference numeral 22. Felt 20 is then moved around a pressure roll 23 which may be of the suction type, and, hence, is entrained around a plurality of guide rolls 24 back to upper couch roll 21. A guard board 25 and showers (not shown) are employed adjacent the surface of felt 20 in front of the point where it contacts the newly formed sheet and accomplishes pickup. Guard board 25 and the showers clean and condition the felt to receive the wet web.

Press assembly 22 comprises an upper press roll 26 and a lower press roll 27, one of which is a suction press roll. A wet felt 28 is entrained over a plurality of guide rolls 30 and over lower press roll 27. One or more of the rolls contacting wet felt 28 and pickup felt 20 is driven to insure movement thereof at the proper speed. Moisture is removed from the newly formed web in the nip of press assembly 22 and transferred into wet felt 28. It is normally removed from wet felt 28 by a wringer roll 29.

The formed and pressed web on felt 20 issuing from the nip of press assembly 22 is then pressed into engagement with the surface of the rotating drying cylinder 31 of a conventional Yankee dryer. The Yankee dryer includes a hood 32 surrounding a portion of the surface of cylinder 31 contacted by the web. Hood 32 includes therein a plurality of air input nozzles 33 and an exhaust means 34 for removing air from the chamber enclosed by hood 32. This flow of air within hood 32 over the surface of the web carried on the drying cylinder 31 assists in removing moisture from the web and accomplishing drying. The paper web 35 shown issuing from the opposite side of drying cylinder 31 is removed from the surface of drying cylinder 31 by a conventional doctor blade 36 which accomplishes creping of the web. In other embodiments where no creping is desired, the web might be pulled from the surface of cylinder 31 without the use of a doctor blade 36.

Web 35 is then fed into a transpiration dryer, one embodiment of which is shown and indicated generally by reference numeral 37. Transpiration dryer 37 includes a rotatably mounted foraminous cylindrical shell 38 over the surface of which a foraminous flexible carrying member or web 40 is arranged in partial wrapping engagement therewith. Carrying member 40 is then fed over a guide roll 41 and around a stretch roll 42 and into the nip between the pressure roll 43 and a pressure roll 44. Cylinder 38 is rotatably driven by means of a motor 45 which is operably connected to cylinder 38 by means of a drive chain 46. Suitable variable speed mechanisms (not shown) may be employed in a well-known manner to control the speed of the dryer.

A pressure hood 47 is positioned over a portion of cylinder 38 contacted by web 35. A blower 48 is arranged to move a gaseous fluid such as air into a heater 50 and, hence, into either one of two ducts 51 and 52 which lead into hood 47 at different points. An exhaust hood 53 is positioned at the bottom of cylinder 38 to withdraw air through the portion of cylinder 38 which momentarily is not covered by foraminous carrying member 40. A duct 54 is connected to a vacuum source 55, which comprises a vacuum blower or a vacuum pump.

With this arrangement heated air is introduced under pressure into hood 47 and is caused to flow through the web 35 and through foraminous carrying member 40 into the foraminous cylinder 38 and then out through the bottom of foraminous cylinder 38 and into exhaust hood 53 after which it is withdrawn through duct 54. Moisture entrained in web 35 is removed by a combination of physical force as well as by evaporative action. Web 35 is removed from member 40 on the opposite side of cylinder 31 by a pickup roll 56 and fed between two calender rolls 57 and 58 as is well-known in the art. The web is then fed over a reel drum 60 and wound into a parent roll 61.

At this point it should be clearly understood that FIG. 1 is intended to illustrate merely one embodiment of apparatus in which one embodiment of a transpiration dryer of the invention is employed as an element thereof. It will be apparent that a transpiration dryer could be employed with a different type of papermaking machine or with a combination of different pieces of equipment or in different arrangements in a papermaking machine. For example, in some instances, it may be desirable to dry a paper web which has not been creped and, in that instance, the transpiration dryer 37 would receive a sheet drawn from press roll 23 which might be substituted for press roll 44 shown in FIG. 1. Obviously, in that instance, various modifications to the design and operating parameters of transpiration dryer 37 would be required to allow it to operate on a web having a greater amount of moisture so as to produce an uncreped but dry web which can then be calendered and wound in the manner shown. In other embodiments or arrangements, the apparatus of FIG. 1 might include, in addition to the elements shown or as substitutes for the elements shown, one or more dryer sections or afterdryer sections operating in cooperation with or in addition to the transpiration dryer 37.

Figure 2:
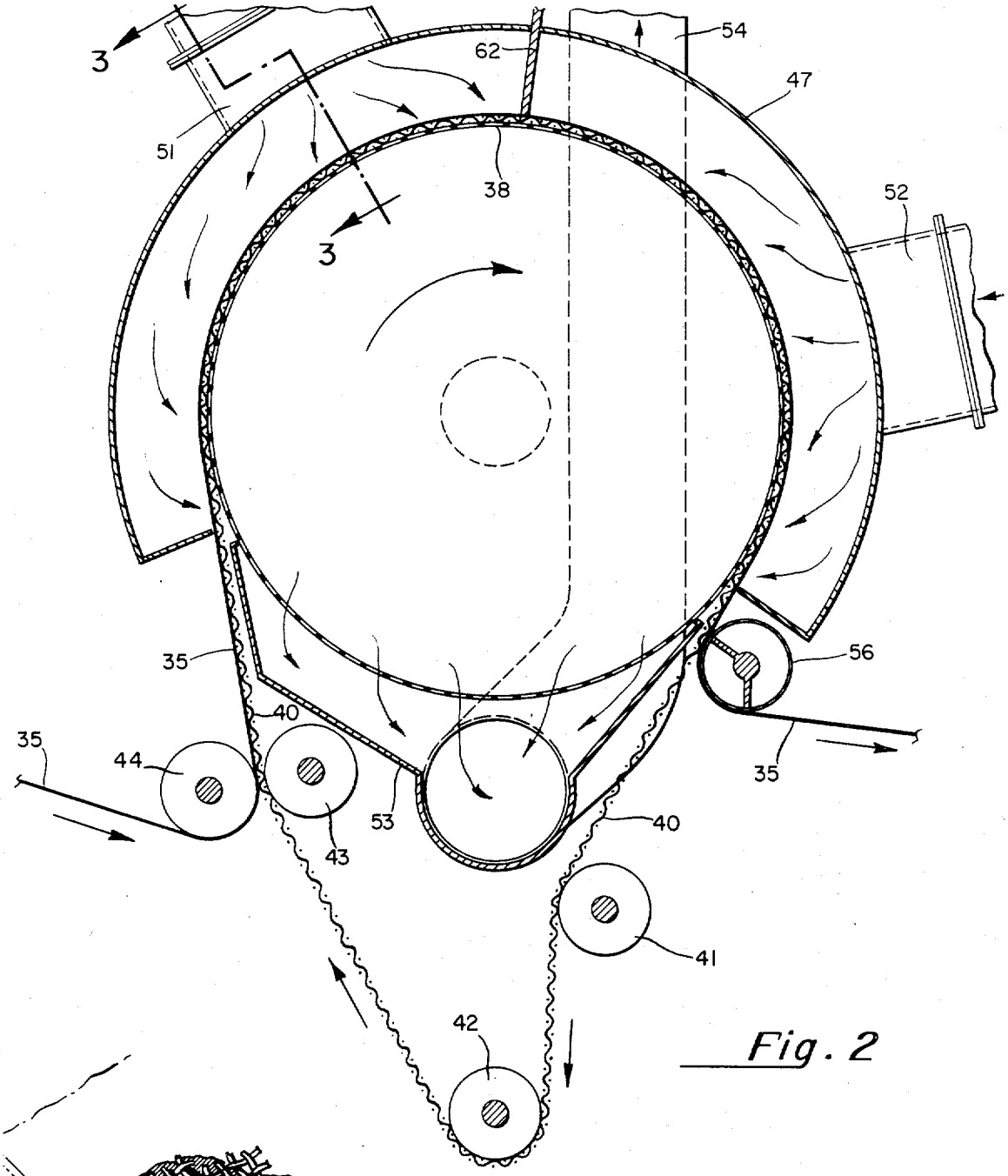
FIG. 2 is an elevation view of a preferred embodiment of a transpiration dryer of the invention.

FIG. 2 is a more detailed sectional elevation view of the transpiration dryer 37 shown in FIG. 1 and illustrates more clearly the construction thereof. The apparatus of FIG. 2 includes a movable baffle 62 extending into hood 47 and transversely across the dryer along the length of foraminous cylinder 38. Baffle 62 is arranged for movement into and out of hood 47 and when inserted, serves to divide the space enclosed by hood 47 into two sections to allow a different pressure to be applied to each section of the hood through ducts 51 and 52 so as to permit drying adjustments for a variety of webs. Ducts 51 and 52 include flow control elements or dampers (not shown) which may be used to control the flow and pressure fed into portions of hood 47.

FIG. 2 also shows more clearly the nature of the foraminous carrying member which in the embodiment shown is a woven wire cloth of a type similar to that employed for Fourdrinier wires commonly used in papermaking. It generally has a more porous weave, however, there are many types of flexible web materials which may be employed for the carrying member 40. For example, these could be some of the woven fiber glass mats or fabrics which demonstrate great strength at higher temperatures, a typical Fourdrinier wire, or a suitable plastic screen. In some instances, the porous supporting member 40 may be constructed of several different layers of foraminous members having differing structure and/or pore size.

In operation, a web 35 is fed into engagement with the wire 40 through the nip of the support roll 43 and a pressure roll 44 and remains in contact with the surface of the wire 40 during the passage of the wire 40 around a portion of the dryer cylinder 38. The web 35 is then withdrawn from the wire 40 onto a suction roll 56 and wound onto a roll for subsequent processing or converting. With the above arrangement, during rotation of the dryer cylinder 38, the wire 40 and the web 35 are moved into a position adjacent the surface of the dryer cylinder 38 and there is substantially no relative movement between these various layers 40 and 35 and the surface of the dryer cylinder 38.

In accordance with the invention, a heated gaseous fluid such as air is fed into the pressure hood 47 wherein it distributes itself substantially uniformly and exerts a pressure bias against the exposed surface of the web 35. The web 35 is supported upon the wire 40 which is correspondingly supported during a portion of its travel upon a portion of the surface of the foraminous cylinder 38. The gaseous fluid is forced through the web 35 and between the fibers thereof causing some of the moisture contained in the web to attain its heat of vaporization and to vaporize. Where the wet web has a high moisture content, much of the moisture will initially be mechanically removed. That is, the air moving through the web will sweep the water off of the fibers thereof and out of the web. In this manner, the kinetic energy of the air is utilized to remove most of the water on the exterior of the fibers and in the pores of the paper. The moisture in the fibers is largely removed by vaporization.

If a heated gaseous fluid is employed, the amount and rate of heat transfer occurring from the gaseous fluid to the moisture is extremely high due to the high velocity of the gaseous fluid as it passes over the fibers. In any event, the rapid movement of the gaseous fluid past the moisture on the web 38 causes some of the moisture to vaporize and it is carried away into the interior of the dryer shell 38. Thus, the gaseous fluid on the interior of the dryer cylinder 38 has an increased humidity over the gaseous fluid fed into the pressure hood 47 due to the moisture picked up from the web 35.

Gaseous fluid is continuously exhausted from the interior of the foraminous cylinder 38 through the openings in that portion of the cylinder 38 enclosed by the exhaust hood 53. The location of the exhaust hood 53 at the lowermost portion of the drying cylinder 38 insures that any moisture in the form of a liquid which passes through the wire 40 and through and into the cylinder 38 will settle to the bottom and will be removed from the cylinder 38.

Depending upon the type of embossing or texturizing treatment desired, portions of the above-described apparatus may be designed so as to accomplish this process during drying of the paper web 35. Thus, in some instances, it may be desired to merely emboss the paper web 35 or create small projections extending outwardly from one surface of the web 35. This is accomplished in accordance with the invention by employing a wire 40 over a foraminous cylinder 38 which is woven so as to provide a plurality of depressions or holes therethrough in a predetermined pattern. During the performance of the process of drying, the air pressure will force the deformable wet paper web 35 to conform to the contour of the supporting wire surface 40 and upon drying, the paper web 35 will retain that form. It is well-known that a web of paper fibers generally follows the normal rules of plastic deformation when wet and has only slight memory characteristics. This is believed to be due to the fact that prior to the inital drying operation, relatively few bonds have been formed between the fibers forming the web, allowing it, therefore, to deform quite readily. However, when once deformed into the desired contoured shape, and then dried, the resulting embossed portions or texturizing effects will tend to have an increased permanency and increased "spring back" over that normally experienced in dry embossing.

It has also been found possible to create perforations or holes in the web during the texturizing and drying processes. Thus, the variations in the process which determine whether mere drying will occur or embossing and drying together with the creation of perforations will occur are quite numerous but with some methods may be a matter of applying the proper pressures. For example, with a given wire and a given initial wet web having a specified basis weight, by controlling the pressure drop between the hood and the exhaust, the above features can be caused or prevented as described above.

Figure 3:
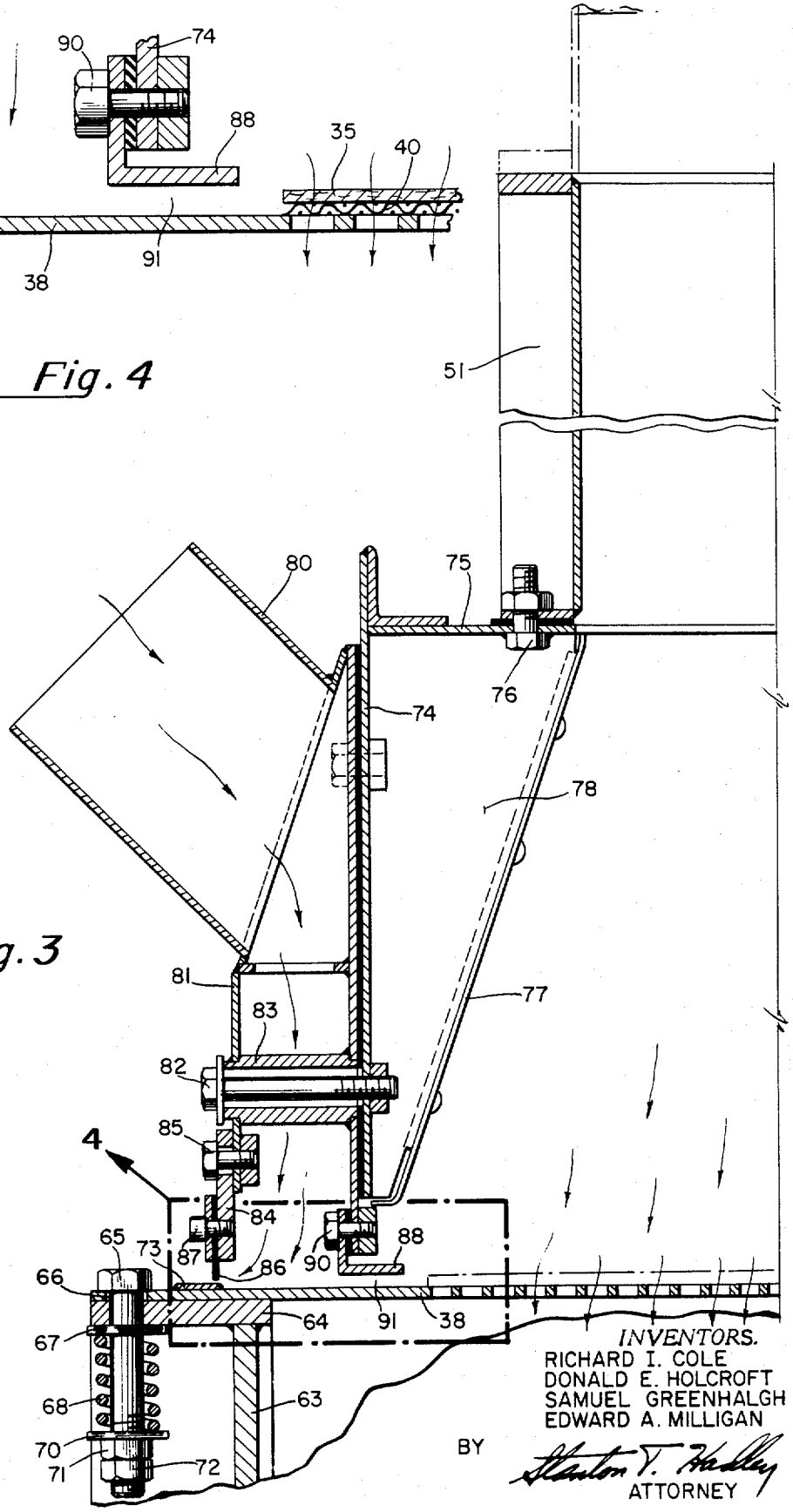
FIG. 3 is a sectional view taken along line 3—3 of FIG. 2.

FIG. 3 is a sectional view taken along line 3—3 of FIG. 2. It illustrates in greater detail the construction of the hood 47 in the areas adjacent the surface of the foraminous cylinder 38 and, particularly, the manner in which a seal is provided between cylinder 38 and the edge of hood 47. A seal is necessary to insure uniform pressure within the area enclosed by the hood 47 across the width of the drying cylinder 38. Similarly constructed seals are employed at the entrance and exit ends of the hood 47 but modified slightly to allow a web to pass freely beneath them. The seal is not so important in these latter areas since they have little or no effect on the moisture profile of the resulting dried paper web. FIG. 3 also illustrates the manner in which the foraminous cylinder 38 is attached to the head 63 containing the bearings upon which the drying cylinder is rotatably mounted.

A section of the dryer cylindrical shell 38 extends beyond heads 63 at each end of the dryers serving to support shell 38. Shell 38 is adjacent and parallel to an outwardly depending flange 64 welded to the outermost edge of header 63. A bolt 65 passes through a hole 66 in cylinder 38 and through a hole in flange 64. Hole 66 has a diameter larger than the diameter of bolt 65 which allows movement of cylinder 38 in a direction parallel to the longitudinal axis of cylinder 38 caused by expansion of cylinder 38 due to heat. It will be appreciated that where air at relatively high temperatures is employed with a dryer of the invention and in instances where momentarily no wet web is entrained over the dryer cylinder 38, the large amount of heat transferred to cylinder 38 will cause substantial expansion thereof which must necessarily be relieved as by enlarged hole 66.

Similarly, expansion of cylinder 38 must be allowed away from flange 64 and outwardly from header 63 to insure roundness of the rotating cylinder 38 and to prevent buckling of the foraminous shell in the event of thermal expansion. To provide for this feature, the through-extending portion of bolt 65 passes successively through a washer 67, a coil spring 68, and a washer 70 and is secured snugly thereto by a pair of nuts 71 and 72. Cylinder or shell 38 may be formed in a plurality of separate sections around the periphery of the dryer shell. Spring 68 must have sufficient compressive force to firmly retain cylinder 38 in contact with the outer surface of flange 64 during normal operation of the transpiration dryer. It will be appreciated that when the dryer is operated at the contemplated speeds of up to 4,000 feet per minute and higher, the centrifugal forces exerted on the plates and hence on each of the springs 68 will be quite substantial. However, it is also well-known that the forces exerted by metals during thermal expansion are quite sufficient to overcome these stresses caused by the spring 68 and will cause cylinder 38 to move outwardly from the outer surface of flange 64.

The above-described construction allows the substitution of different foraminous cylinder members 38 into the dryer or for the replacement of worn cylinders 38. This feature is important where an embossing operation is performed and it is desired to change the pattern of embossing.

Figure 4:
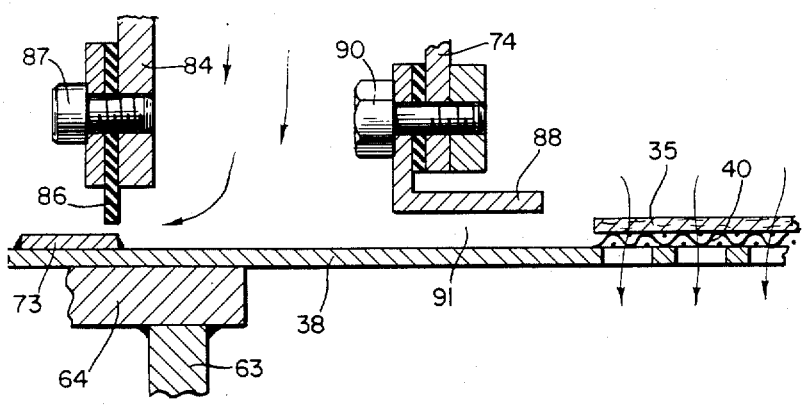
FIG. 4 is a greatly enlarged view of a portion of FIG. 3.

The manner in which the hood 47 is sealed at its side edges adjacent the surface of cylinder 38 at the longitudinal ends thereof, will now be described. As shown in FIG. 3 and in greater detail in FIG. 4, cylindrical shell 38 has a raised portion or strip 73 extending around its outside surface and welded thereto along a line inwardly spaced from the shell 38. The side wall 74 of hood 47 extends vertically downward toward the surface of shell 38. A top wall 75 is attached to side wall 74 at each side of hood assembly 47. The end of duct 51 is secured to the top wall 75 by bolts 76 and is adapted to insert air under pressure into the chamber enclosed by a wall member 77 and top wall 75 through an opening in top wall 75.

Wall member 77 extends upwardly from the bottom of side wall 74 to the top wall 75 enclosing chamber 78 in which is disposed insulation. This feature is important where the air is heated to relatively high temperatures prior to passage through the web to minimize heat losses.

On the opposite side of side wall 74 a duct 80 is provided leading to a source (not shown) of seal air under pressure substantially equal to the pressure of the air on the interior of hood 47. Duct 80 leads to an arcuate chamber formed by a second side wall member 81 outwardly spaced from the open side wall 74. Member 81 is secured to side wall 74 by means of a bolt 82 holding it against a spacer member 83. Member 81 has an extension 84 stretching toward the surface of cylinder 38 and bolted to member 81 by bolts 85. Seal strip 86 made of a resilient material, such as rubber or plastic, bolted by means of a bolt 87 to the lower end of extension 84 is arranged to ride in sealing contact with strip 73 on the surface of cylinder 38 to substantially prevent the passage of seal air through that joint.

Side wall 74 has an angle 88 adjustably secured along its bottom edge adjacent its cylindrical surface 38 by means of a bolt 90. A slight clearance or space 91 is provided between bottom surface 88 and the outermost surface of shell 38 so that the pressure of the seal air entering through duct 80 causes it to pass through the chamber defined by side walls 81 and 84, and, hence, through the space 91 between member 88 and shell 38 to balance the pressure in hood 47.

It should be understood that in operation, the above-described seal mechanism prevents flow of heated air from the interior of hood 47 outwardly through space 91. This flow would cause an increase in heated air flow near the edges of the paper web being dried and would cause overdrying of these edges. It is similarly not intended that substantial flow of the seal air occur into the chamber defined by hood 47 through the space 91 since the addition of this cooler seal air into the heated drying air passing through the edges of the paper web would cause them to be insufficiently dried. In accordance with the invention, suitable control mechanisms (not shown) are employed in connection with the supply of air to duct 80 to insure that the pressure of the seal air passing through duct 80 is substantially equal at all times to the pressure of the gaseous fluid on the interior of hood 47. In this manner, a seal is provided while flow through space 91 in either direction is minimized.

In practice, resilient seal strip 86 rides in contact with or immediately adjacent to the surface of strip member 73 and provides a mechanical type seal on this side of the hood, preventing or minimizing leakage of the seal air. As the strip 86 wears during operation of the dryer, it may be periodically placed or adjusted to reduce the clearance involved. Since flow of the seal air into the chamber is minimized and controlled, the seal air is normally at ambient temperature.

Figure 5:
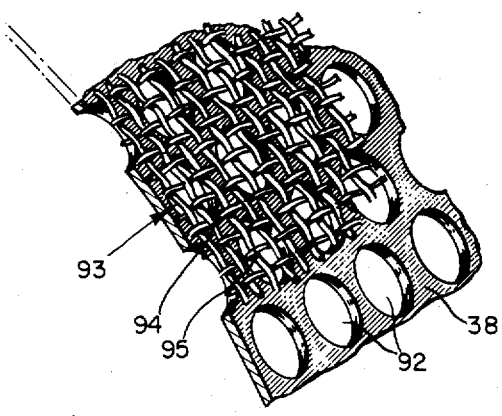
FIG. 5 is a greatly enlarged perspective view of a portion of the foraminous dryer shell and the foraminous layer arranged in contact therewith.

FIG. 5 is a greatly enlarged perspective view of a portion of the dryer shell illustrating the relationship between the foraminous shell or cylinder 38 and a typical flexible foraminous layer of woven wire or other material superimposed thereon. As will become apparent from subsequent description, the size and shape of the openings in shell 38 may vary depending upon the process involved and the type of product desired. Similarly, the type of flexible web material superimposed over the cylinder 38 can vary considerably in construction and in size and shape relationships.

The example shown in FIG. 5 comprises a section of cylindrical shell 38 having openings 92 passing therethrough. These openings may typically have a size of about 3/8 inch diameter where a flexible web is employed over them as shown to support the paper web. The flexible web indicated generally by reference numeral 93 is comprised of a plurality of parallel warp strands 94 oriented perpendicular to the axis of the cylinder 38 and interwoven with a plurality of parallel shute strands 95 arranged perpendicular to the warp strands. A wide variety of weaves and materials can be employed for flexible web 93. It will be apparent from the above description that the openings between the strands may be varied to advantage to perform alternative methods of the invention.

Cylinder 38 comprises a shell of metal such as steel having a thickness of about 1/8 inch. The cylinder 38 could be formed of many types of porous materials such as sintered metal, perforated plate, expanded metal, or honeycomb structures provided that these structures have sufficient porosity to allow the free passage of gaseous fluids therethrough at high speeds. The thickness of these materials is not critical to the process although strength is an important factor in the apparatus. The main consideration in the construction of the layers shown in FIG. 5 is to provide a means for supporting a wet web of loosely attached and bonded paper fibers while the paper fibers are subjected to a drying action by a gaseous fluid under high pressure.

It is also desirable in accordance with the method and apparatus of the invention to minimize the pressure drop created by the supporting surface. That, in the case of FIG. 5, is the composite structure formed by layer 38 and layer 93. It is preferable to have the major portion of the pressure drop created by the paper web being dried in order to carry out the process of the invention in the most efficient manner. Therefore, any pattern of openings or apertures employed in cylinder 38 should be sufficiently concentrated so that areas of cylinder 38 comprising the interconnecting web materials between the apertures or openings do not seriously impede the substantially uniform passage of gaseous fluids through the supporting structure. This enables uniform drying of the wet paper web.

The following examples illustrate the application of the method and apparatus of the invention in the drying of wet paper webs of differing basis weights. The paper web in Example 1 is a tissue weight paper which might be used in a number of sanitary paper products while the paper web in Example 2 is a towel weight paper of the type used as disposable paper toweling. Throughout the examples, reference numerals utilized in describing FIGS. 2 and 3 will be referred to for purposes of clarity.

EXAMPLE 1

A paper stock slurry of 3.32% consistency comprising a mixture of 40% soft wood sulphite pulp, 13% pine kraft pulp, 39% hardwood kraft gum pulp and 8% mechanical fiber pulp was defined to a 482 cc. Canadian Standard freeness. The stock was pulped through a typical stock system with the necessary piping, pumps, overflow chests, controls, cleaners, etc. to a diffusion chamber and slice. A paper sheet was formed, pressed, partially dried, and creped on apparatus similar to that described in U.S. Pat. No. 3,252,853. The wet web 35 was fed in an unsupported condition from the creping doctor 36 at 40.6% moisture to the pressure roll 44. It was lightly nipped by pressure roll 44 against pressure roll 43 causing the wet web to be applied to the plain weave double crimped carrying wire 40 made of Phosphor bronze with 14 shute wires per inch of 0.019 inch diameter and 16 cable warps per inch of 0.25 inch diameter. The wire 40 carrying the wet web 35 contacted the hollow cylinder 38 made of two 6 foot diameter 1/4 inch thick steel heads 63 as shown in FIG. 3, suitably braced and covered with an 11 gauge steel perforated blade 38 having a plurality of 21/32 inch diameter (0.328 inch) holes staggered on 7/16 inch centers, resulting in a 50% plate open area. The plate 38 was suitably attached to allow for expansion as shown in FIG. 3. The wet web 35, the wire 40 and the perforated plate 38 were advanced together through a hood 47 at a speed of 1635 feed per minute. This was 368 feet per minute slower than the surface speed of the Yankee dryer 31 resulting in a web 35 having a weight of 13.9 pounds per 2880 square feet on wire 40. The dry end of hood 47 wrapped the plate 38 for 82° of angular motion and was supplied with air at 610° F. through duct 52 in a manner such that the air pressure immediately above web 35 was at atmospheric pressure (0 inches of water). The wet end of hood 47 supplied by duct 51 was not operating and the dampers were closed. The air at 610° F. was forced through the web 35 at a velocity of 3.7 feet per second thereby transferring heat to the water in web 35 causing the water to evaporate and the resulting vapor to pass through the web 35, the wire 40, the perforated plate 38, and into the interior chamber which was under a vacuum of 2.0 inches of water. The air temperature in passing through the web 35 was found to have dropped from 610° F. in the hood 47 to 170° F. in the interior chamber. The air was then removed from the interior chamber through the roll 38 across the bottom, through perforated plate 38, wire 40 into exhaust hood 53 and out duct 54 by means of an exhaust blower. A web 35 was removed from wire 40 by means of an air blow-off shower positioned between pickup roll 56, guide roll 41, wire 40 and exhaust hood 53. The web 35 as removed from wire 40 had 6.4% moisture. The web 35 was conveyed to calender 57 and 58 and reeled up in a parent roll 61 by a reel 60. There was no evidence of non-uniform drying, marking, or deterioration of sheet quality when the web was dried in this manner. The quality of this web, dried by the passage of air at a temperature of 610° F. through it, was within accepted standards for this type of paper web. The results of the physical tests of this web are shown in Table IV below.

TABLE IV

| Physical Tests: | Results |
|---|---|
| Tensile, oz. per inch, Instron tester: | |
| Machine direction | 17.7 |
| Cross machine direction | 9.3 |
| Stretch, percent (Instron tester): | |
| Machine direction | 6.1 |
| Cross machine direction | 4.2 |
| Bulk (24 sheets), inches | 0.081 |
| Brightness (G.E. tester) | 83.5 |
| Absorbency (cured), seconds | 12.3 |

EXAMPLE 2

A paper stock slurry of 3.15% consistency comprising a mixture of 55% Soundview soft wood sulfite pulp, 37% pine kraft pulp and 8% mechanical fibers was refined to a 456 cc. Canadian Standard freeness. The sheet was formed, pressed, partially dried, and creped, on apparatus similar to that described in U.S. Pat. No. 3,252,853. The wet web 35 was fed to the wire 40 in the manner and under the condition described in Example 1. The wet web 35, the wire 40, and the perforated plate 38 were advanced together through a hood 47 at a speed of 802 feet per minute, 202 feet per minute slower than the Yankee 31 surface speed, resulting in a web 35 having a weight of 31.3 pounds per 2880 square feet on wire 40. Hood 47 wrapped a portion of the plate 38 and was supplied with 582° F. air at 5.0 inches of water pressure by wet end duct 51 and 632° F. and 4.2 inches of water by dry end duct 52. The seal air which surrounds hood 47 was typically supplied by duct 80 shown in FIG. 3 at a pressure of 4.5 inches of water to minimize the hot air leakage from the wet end hood and at a pressure of 4.6 inches of water to minimize the leakage of hot air from the dry end of hood 47. The seal air pressure was adjusted so that it balanced the hot air pressure typically found at location 91 for hot air leakage control.

The 582° F. air was forced through the wet web 35 at a velocity of 6.10 feet per second as it was carried through the first portion of hood 47 which wrapped roll 38 for 138°. The 632° air was forced through the partially dried web 35 at a velocity of 5.53 feet per second as it was carried through the last portion of hood 47 which wrapped roll 38 for 82°. The vapors were conveyed from the web 35 through wire 40, perforated plate 38 to the interior of the roll which was under a vacuum of 6.4 inches of water generated by the exhaust blower attached to exhaust duct 54 and exhaust hood 53. The air (now at 200° F.) passed through the perforated plate 38, wire 40 and into exhaust hood 53, out duct 54, and into the atmosphere. The web 35 was removed from wire 40 by means of an air blow off shower positioned between pickup roll 56, guide roll 41, wire 40 and exhaust hood 53. Web 35 as removed from wire 40 contained 3.1% moisture. The web's creped basis weight was 31.3 pounds per 2,880 feet. Web 35 was conveyed to calender 57, 58 which was operating at a speed of 813 feet per minute where it was reeled up into parent roll 61.

The paper web, dried in this manner, showed no signs of nonuniform drying, marking or deterioration of sheet quality. The web 35 was exposed to the high temperature air for 0.86 seconds. The drying rate under hood 47 was 27.7 pounds of water removed per hour per square foot. The quality of this web, dried by the passage of air at a temperature of up to 632° F. through it, was within typical standards for this type of paper. The results of the physical tests run on this web are shown on Table V.

TABLE V

| Physical tests: | Results |
|---|---|
| Tensile, ounces per inch, Instron tester: | |
| Machine direction | 79.9 |
| Cross machine direction | 58.0 |
| Stretch, percent (Instron) | |
| Machine direction | 16.2 |
| Cross machine direction | 3.3 |
| Bulk (24 sheets), inches | 0.144 |
| Brightness (G.E. tester) | 80.0 |
| Absorbency, (cured) seconds | 12 |

Although a specific embodiment of apparatus has been described above illustrating a preferred method and apparatus of the invention, it will be apparent that a number of variations in the basic equipment and method of the invention may be made without departing from the spirit and scope of the invention. FIGS. 6 through 10 illustrate some of these alternative embodiments.

Figure 6:
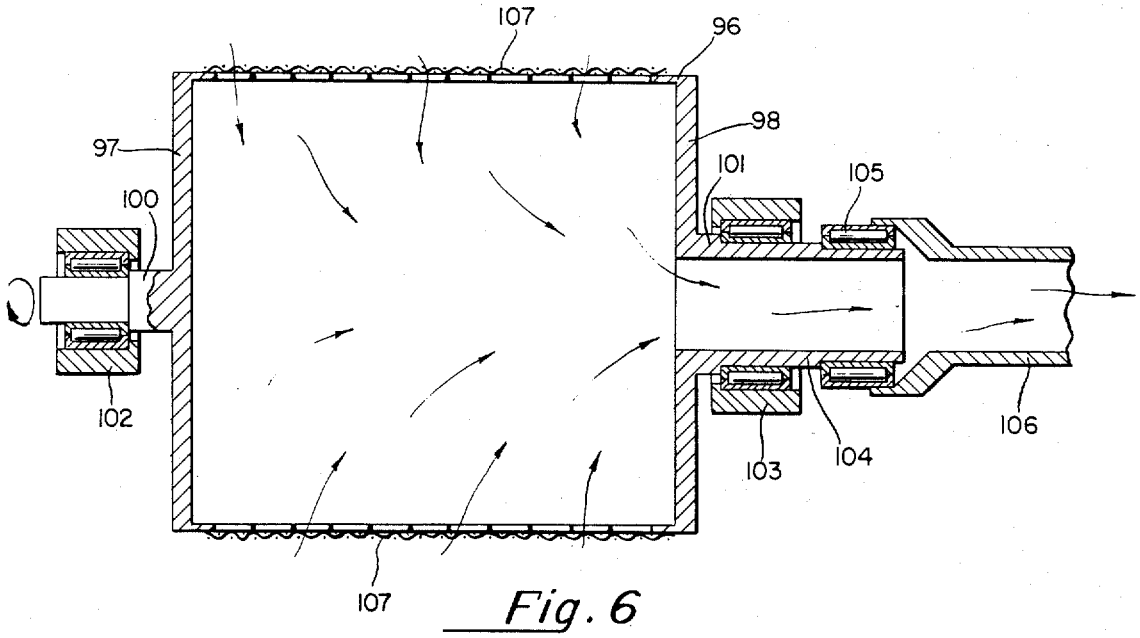
FIG. 6 is a sectional plan view of an alternative embodiment of the invention.

Thus, FIG. 6 is a partial plan view of an alternative embodiment of the transpiration dryer shown in FIG. 2 and illustrates a rotably mounted foraminous cylindrical shell 96 carried by a pair of spaced headers 97 and 98. Journals 100 and 101 extend axially outwardly from headers 97 and 98 and are carried by a pair of journal bearings 102 and 103, respectively. Journal 101 has a portion 104 extending beyond bearing 103 and carries a seal bearing 105 on its outermost end. Journal 101 and extending portion 104 thereof are hollow and allow the passage of fluids from the interior of the cylindrical shell 96 therethrough. A duct member 106 is attached to the seal bearing 105 and is connected to a vacuum source (not shown). In this manner, air passing through the web 107 carried on the surface of shell 96 is withdrawn from the interior of shell 96 through the passage in journal 101 and out through duct 106. This arrangement enables the elimination of the exhaust hood 53 shown in FIGS. 1 and 2 but will require the addition of a shield member (not shown) along the portions covered by exhaust hood 53 to prevent the passage of air through the cylinder over that area. This shield member may be stationarily mounted with a slight clearance between it and the outside surface of the rotating dryer cylinder 38.

Figure 7:
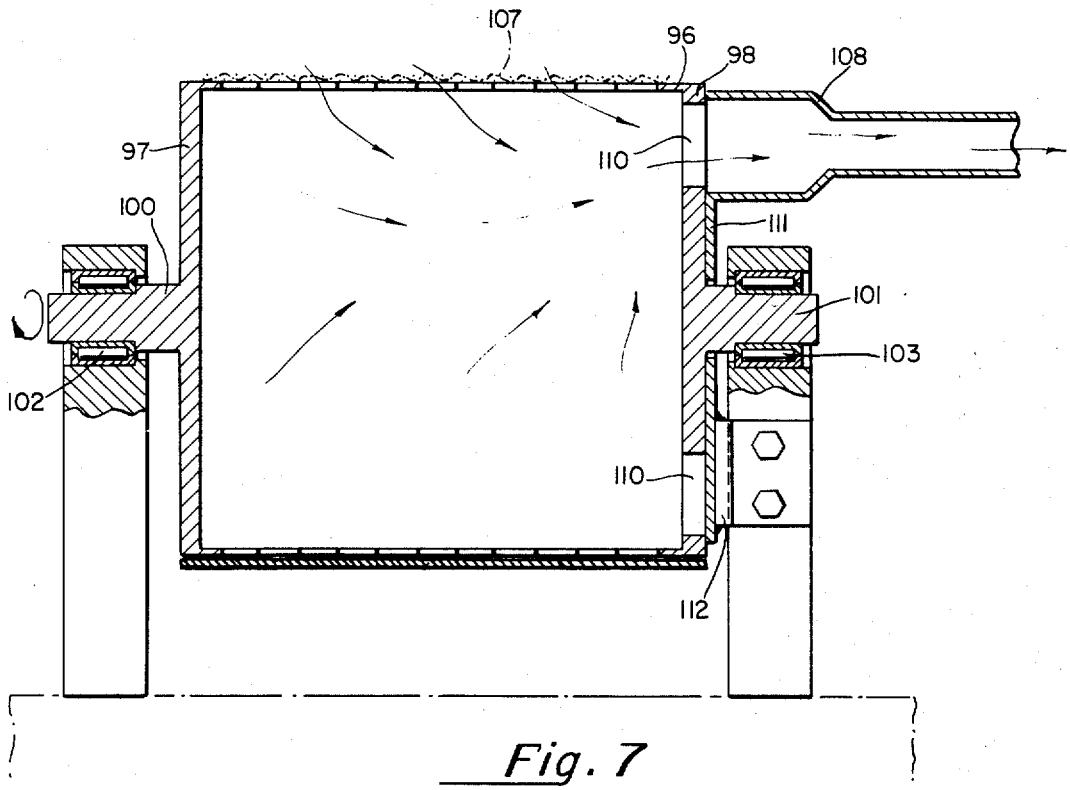
FIG. 7 is a sectional elevation view of an additional alternative embodiment of the invention.

FIG. 7 shows a still further alternative embodiment of the dryer shown in FIG. 2 having a foraminous cylindrical shell 96 carried by spaced headers 97 and 98 on journals 100 and 101 carried in bearings 102 and 103, respectively. In this embodiment, a plurality of openings 110 are provided in header 98 which, during rotation of cylinder 96, pass adjacent to the opening in a duct 108 which is connected to a vacuum source (not shown). When openings 110 are not adjacent the opening in duct 108, they are passing closely to but just out of contact with a shield plate 111 stationarily mounted by a bracket 112 on a dryer frame and extending around the entire end or outer surface of header 98. By this arrangement, air passing through web 107 carried on shell 96 is withdrawn from the interior of shell 96 through one of the openings 110 which is adjacent the open end of duct 108 and, hence, withdrawn by the vacuum source.

Figure 8:
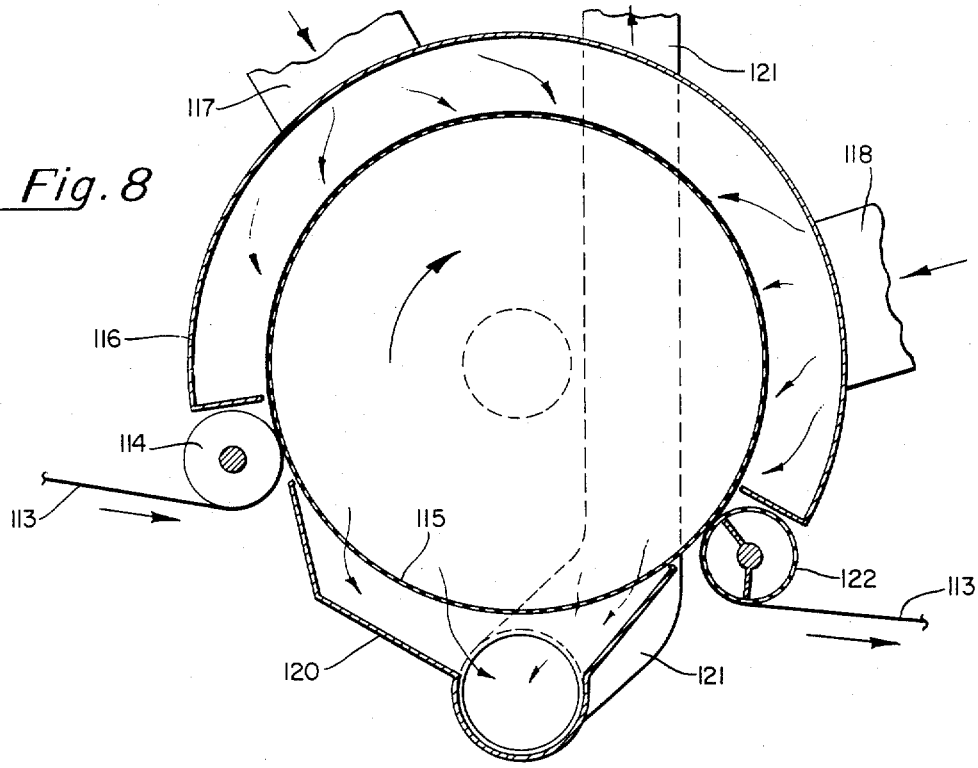
FIG. 8 is a sectional end view of a still further alternative embodiment of the invention.

FIG. 8 illustrates a still further embodiment of the invention wherein the flexible carrying member 40 shown in FIGS. 1 and 2 is eliminated and the paper web 113 is fed by a pressure roll 114 into engagement with the surface of a foraminous cylinder shell 155 mounted for rotation. A pressure hood 116 receives air from ducts 117 and 118 in a manner similar to that shown in FIGS. 1 and 2. Similarly, an exhaust hood 120 is connected by a duct 121 to a vacuum source (not shown). The web is withdrawn from cylinder 115 by means of a suction pickup roll 122. In this instance, the surface of cylinder 115 has a plurality of relatively fine openings so that it adequately supports the web. This is especially true where no embossing of the paper web is desired. A wire type sleeve generally used on cylinder rolls may be used around shell 38. Generally, these openings are much smaller than ⅜ inch openings typically employed in the shell 38 as shown in FIGS. 1 and 2 and may range from extremely fine openings such as those contained in a sintered metal shell to openings up to about ⅛ inch. If embossing is desired as described above, these openings may be even larger.

Figure 9:
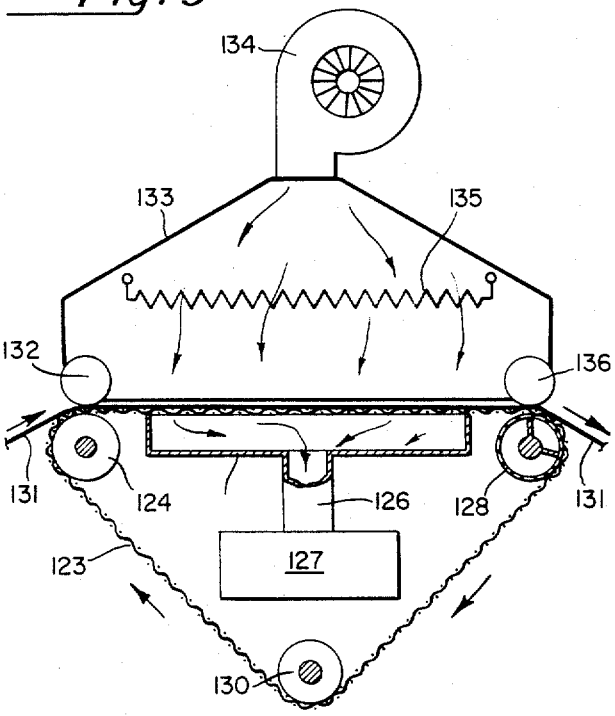
FIG. 9 is a sectional side elevation view of a still further alternative embodiment of the invention.

FIG. 9 illustrates a still further alternative embodiment of the dryer of the invention where a flexible carrying member 123 is fed over a first support roll 124 and over the surface of a vacuum box 125 connected by a duct 126 to a vacuum source 127 and, hence, passes over a second supporting blow roll 128 and over a guide or tension roll 130 back to support roll 124. A web 131 is fed into engagement with foraminous carrying member 123 and is pressed into contact with the upper surface of 123 by a pressure roll 132 carried by the forward lip of a hood 133 which also serves to seal the forward edge of the hood to prevent the leakage of gaseous fluid therefrom. Air is provided under pressure by a pressure blower 134 and the air is heated by passing over a heating coil 135 connected to a suitable electrical source (not shown) and is directed under pressure toward the web carried on member 135 over a vacuum box 125. Alternatively, gas or oil fired heating units or high pressure steam may be used to heat the air. The exit end of hood 133 is sealed by a second pressure roll 136 and the web 131 is withdrawn from carrying member 123 and calendered and wound as shown in FIG. 1. The side portions of hood 123 are arranged to ride in a position of slight clearance above the surface of the web 131 so as to form a mechanical seal.

Figure 10:
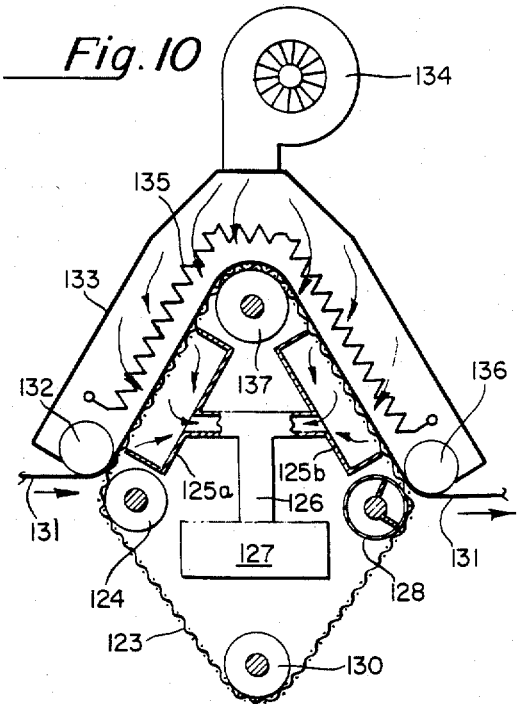
FIG. 10 is a sectional side elevation view of a still further alternative embodiment of the invention.

FIG. 10 illustrates a modified embodiment of the dryer shown in FIG. 9 where a greater amount of dryer contact time is provided in a reduced horizontal space. In this embodiment, a third support roll 137 is positioned above and between support rolls 124 and 128 and the vacuum box 125 is divided into two vacuum boxes 125a and 125b, each being connected by a duct 126 to a vacuum source 127. In this embodiment, the web 131 is pressed into engagement with formanious carrying member 123 at the forward end of the hood 133. Pressure roll 136 forms a seal between hood 133 and the paper web on the carrying member 123.

To attain even higher drying efficiency from transpiration dryers as described above, it is advantageous to employ radiant heaters within the hood adapted to heat the wet web by radiation as an assist to the amount of heat transferred by the moving air. These may be any well-known type, using gas, oil, or electricity as a power source.

To accomplish an alternative embodiment of the invention wherein the wet paper web is treated with pressure so that portions of it are forced into openings in the foraminous supporting surface, the invention involves a number of different forms of apparatus. From the above description of this method of embossing a wet paper web and of forming various novel paper products, it will be apparent that many different types of apparatus could be employed. Therefore, the following specifically described embodiments of apparatus are intended to disclose only preferred forms of apparatus and alternative embodiments thereof.

Figure 11:
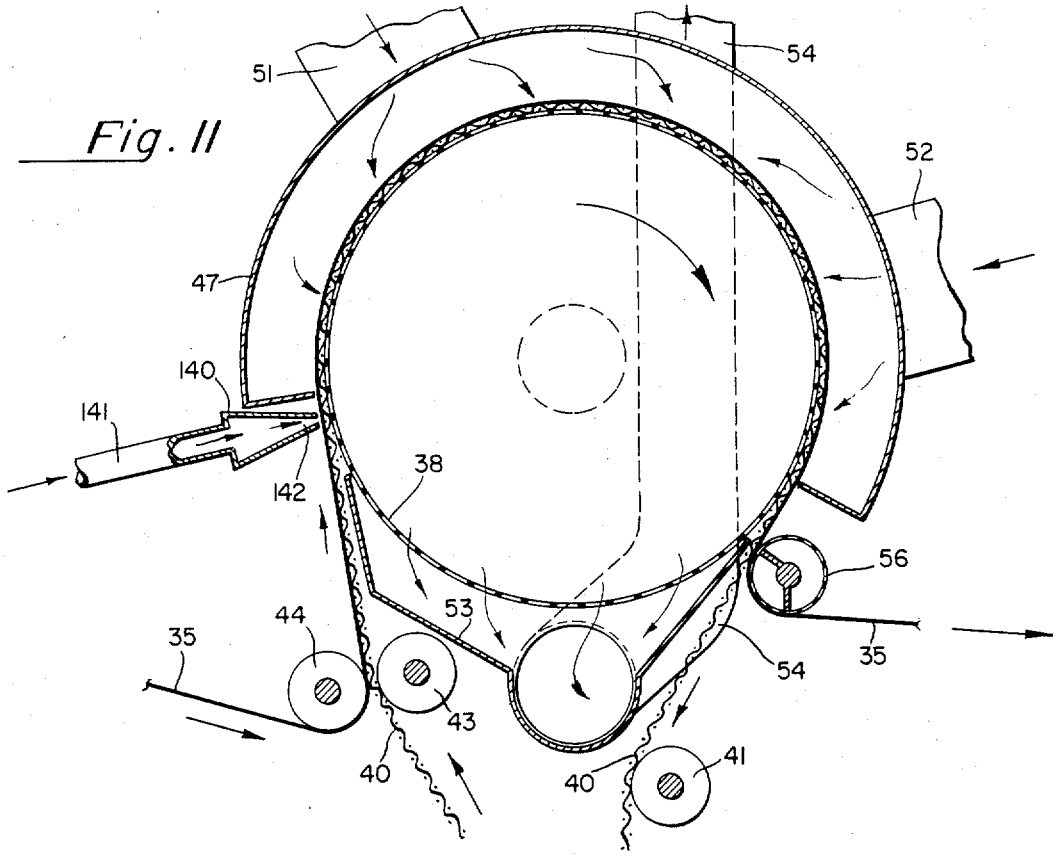
FIG. 11 is a sectional side elevation view of the transpiration drying apparatus of the invention including means for embossing.

FIG. 11 is a partial sectional side elevation view of apparatus constructed generally according to FIG. 2 but including additional provision enabling the accomplishment of the embossing process in conjunction with the transpiration drying process. To avoid undue confusion and repetition in the following description, the same reference numerals employed in FIG. 2 will be employed to the extent possible in the description of FIGS. 11, 12 and 13. A wet paper web 35 is fed into engagement with a foraminous carrying member 40 and between the nip of pressure rolls 43 and 44. It then is carried on carrying member 40 around a portion of the circumference of foraminous cylinder 38. Web 35 is removed from carrying member 40 after passing through the drying zone under hood 47 by a vacuum pickup roll 56 and, hence, transferred to subsequent equipment.

An air knife 140 connected by a conduit 141 to a source (not shown) of high pressure air is disposed in a position normal to the surface of web 35 and carrying member 40 immediately prior to the entrance into hood 47. By directing high pressure air through an orifice 142 toward the web, the fibers thereof will be aligned into new positions by the fluid force so that portions of web 35 overlying holes in foraminous carrying member 40 will be forced out of the plane of web 35 and into the plane of carrying member 40. These portions will be shaped and arranged substantially in the image of the openings in foraminous carrying member 40. It has been found that by supplying air to air knife 140 at a sufficiently high pressure, holes or apertures can be created in wet paper web 35 by additional reorienting and movement of fibers in the impressed portions of the web. Thus, the web is ruptured at the points most remote from the plane of the paper web in the portions overlying the openings in the supporting member 40 as shown in FIG. 15. Where treated on a woven wire surface having upwardly projecting knuckles, holes may be formed in the web in portions overlying the knuckles.

Suitable controls can be employed to control the air pressure issuing from air knife 140 to obtain the desired products described above. Once fibers in portions of the web have been oriented while the web 35 has a relatively high percentage of moisture, the web is dried and the normal bonds created during papermaking are formed between the fibers thereof so that the embossed areas or deformed portions of the web have substantial resiliency and permanency.

Figure 12:
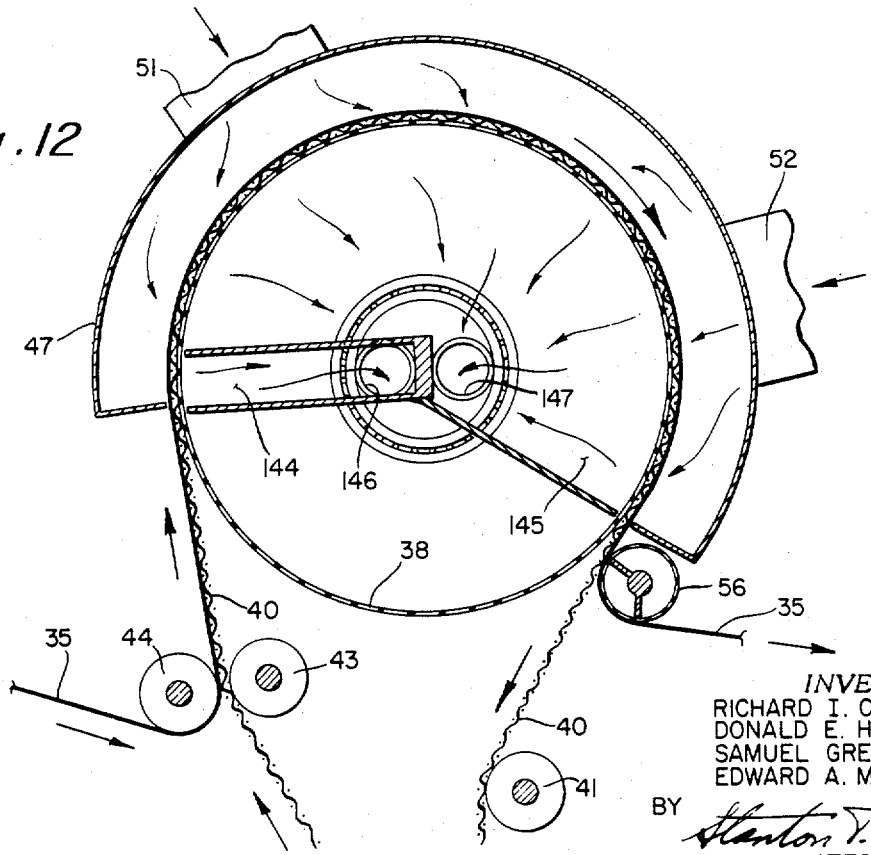
FIG. 12 is a sectional elevation view of a transpiration drying apparatus of the invention illustrating alternative means for embossing.

FIG. 12 represents an alternative embodiment of apparatus for accomplishing the embossing step in which at least two vacuum chambers are employed in the interior of the foraminous shell 38. In this instance, a vacuum chamber 143 is arranged to act upon the paper web 35 immediately after its entrance into hood 47. The vacuum in chamber 144 should be quite high to accomplish embossing or deformation of the web while the web and the fibers comprising it are in a relatively plastic state. A second vacuum chamber 145 is employed for the drying region, for which a relatively lower vacuum is required for drying. A duct 146 is arranged to draw a relatively high vacuum from chamber 144 through the axis of cylinder 38 and a duct 147 is arranged to draw a relatively low vacuum from chamber 145 through the axis of cylinder 38 in a manner well-known in the art.

Figure 16:
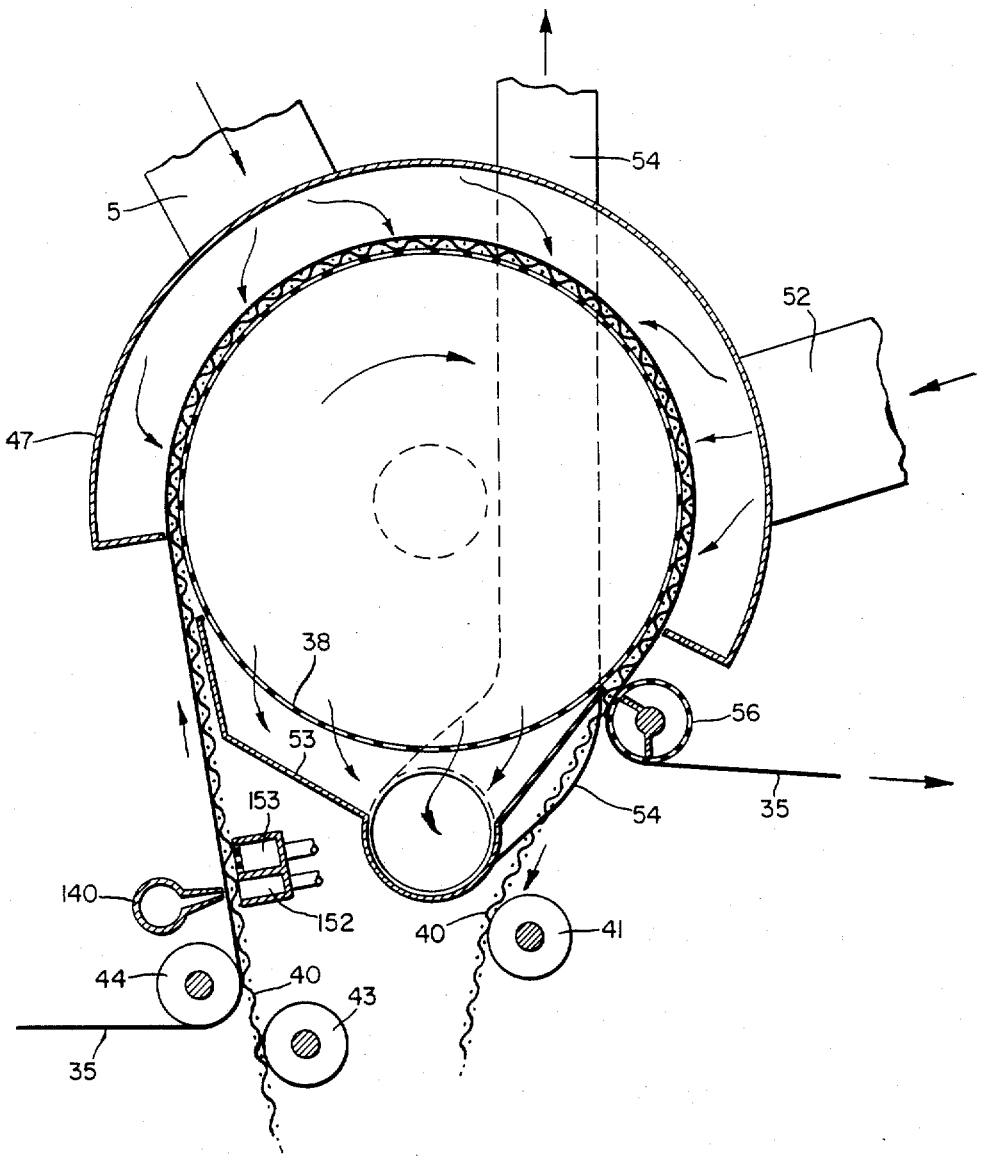
FIG. 16 is a sectional elevation view of transpiration drying apparatus of the invention illustrating alternative means for embossing.

FIG. 16 illustrates the most preferred form of drying and embossing apparatus of the invention in which, in general, the features of the embossing apparatus shown in FIGS. 11 and 12 are combined with each other along with the dryer configuration of FIG. 2. For purposes of clarity, reference numbers relating to FIG. 11 have been used wherever they refer to corresponding parts in FIG. 16.

In FIG. 16, the air knife or nozzle 140 is directed toward the web 35 upon member 40 between roll 44 and the point where the web 35 passes into hood 47. Nozzle 140 is connected to a source of high velocity air (not shown) and is adapted to direct it against successive transverse segments of web 35 as it is carried past nozzle 140. Nozzle 140 is adjacent but spaced from web 35 and member 40 so as not to contact or damage web 35 by rubbing against it. It is disposed quite close to web 35 to promote the action of the high velocity air against the web 35.

A two compartment vacuum box having a leading compartment 152 and a trailing compartment 153 is disposed adjacent the opposite side of carrying member 40 in a position generally opposite nozzle 140. It is preferred that leading compartment 152 be directly opposite nozzle 140 so as to receive substantially all of the air issuing from nozzle 140 which passes through the web 35. In this manner, it makes the force from air issuing from nozzle 140 more effective in embossing web 35. Leading compartment 152 is connected to a source of high vacuum (not shown) while trailing compartment 153 is connected to a source of relatively high vacuum (not shown) which is generally less than the vacuum of compartment 152. The function of trailing compartment is to receive and remove any air which becomes trapped between web 35 and member 40 which would otherwise tend to lift web 35 off of member 40. It also picks up any air from the surface of web 35 which has been deflected from nozzle 140, and draws this air through web 35 and member 40, tending to hold them together.

The apparatus shown in FIG. 16 accomplishes fiber rearranging and forces the web 35 into conformity with the undulating surface of member 40 before it enters the principal drying region beneath hood 47. Thus, the high velocity air and high vacuum simultaneously cooperate on successive transverse segments of moving web 35 to emboss the web into the desired configuration as determined by the the carrying surface, after which it is dried to form bonds which cause it to retain this embossed shape.

Figure 13:
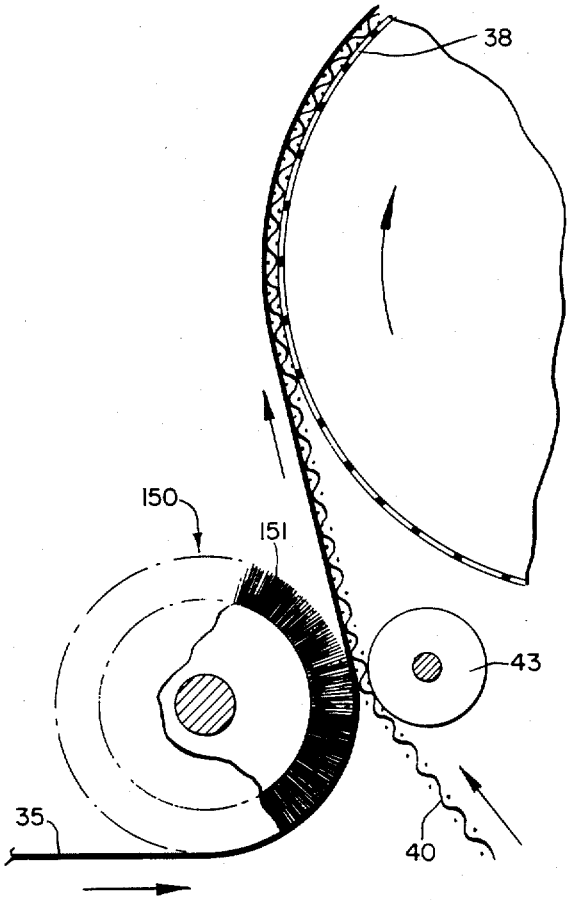
FIG. 13 is a partial sectional elevation view of apparatus according to the invention illustrating an alternative method and apparatus for embossing.

FIG. 13 illustrates a method and apparatus for impressing web 35 on carrying member 40 and employs a resilient embossing roll 150 in place of roll 44 shown in FIG. 2 and forming a pressure nip with pressure roll 43. Roll 150 has a plurality of bristles 151 extending radially outward from its cylindrical surface. Bristles 151 serve to press the paper in the portions of the web 35 covering the holes in foraminous carrying member 40 into the holes so as to emboss the web. Although bristles 151 are shown in FIG. 13, a number of different constructions may be employed for roll 150 and in some instances may comprise a resilient foam-like material or a combination of foam and fibers. A roll formed from compressed discs of felt, fabric or paper may also be employed for this embossing function.

In each instance where apparatus of the type shown in FIGS. 11, 12 and 13 is employed, the apparatus cooperates with the transpiration drying equipment to form a new and improved paper product by a new and improved process. Thus, in each of the above-described instances, the fibers are rearranged and the web is deformed while it has a relatively high precentage of moisture and is in a generally plastic state. The web is then dried in the deformed condition by the transpiration drying process so that the bonds are formed between the fibers thereof and the embossed regions exhibit superior strength and permanency.

What we claim is:

1. A method for drying a substantially continuous wet web of paper fibers issuing at high speed from a papermaking machine, including the steps of pressing the web into contact with a foraminous surface, advancing said web into a drying zone while supporting it on said foraminous surface, contacting the surface of said supported web most remote from said foraminous surface with a gaseous fluid under a pressure greater than atmospheric pressure, creating a pressure drop and a flow of gaseous fluid through the web from the surface most remote from said foraminous surface to the surface adjacent said foraminous surface, advancing said web out of said drying zone, and withdrawing said web from said foraminous supporting surface.

2. A method according to claim 1, wherein said gaseous fluid is air at a temperature of up to about 1,500° F.

3. A method according to claim 1, wherein said gaseous fluid is air at a temperature of from about 300° F. to about 800° F.

4. A method according to claim 1, including the step of reducing the pressure of the surrounding gaseous fluid at the surface of said web adjacent said foraminous surface to a value lower than atmospheric pressure.

5. A method according to claim 1, wherein said foraminous surface contains a plurality of openings arranged in a predetermined pattern, and including the step of forcing the cellulosic fibers in portions of wet web covering said openings in said foraminous surface to shift their positions relative to one another and to the remainder of said web so that said web portions are forced generally toward and into said openings at least partially out of the plane of said web and into the plane of said foraminous surface.

6. A method according to claim 5, wherein a web is momentarily subjected within said drying zone to a stream of fluid across at least a portion of its width which causes said fibers to shift their positions.

7. A method according to claim 5, wherein said cellulosic fibers are re-arranged to form apertures of a larger size than the interstices between the cellulosic fibers of the wet paper web, said apertures being located generally at the outermost extremities of said web portions which are forced generally toward and into said openings.

8. A method according to claim 5, wherein said forcing step is at least partially performed prior to the advance of said supported web into said drying zone.

9. An embossed cellulosic fiber web *having a basis weight in the tissue or towel product range*, comprising a generally flat sheet defined by randomly interwoven cellulosic fibers between two parallel planes, said fibers being bonded together at randomly spaced points throughout the paper matrix where they contact one another by the bonding process associated with papermaking, said sheet having regularly spaced portions thereof extending beyond at least one of said planes from the space between said planes, said portions representing raised contoured portions of said sheet, *and being spaced to have a concentration of from* 36 *to* 760 *per square inch of sheet*, substantially all of the bonds between the fibers in said raised contoured portions being intact, whereby said raised contoured portions of said sheet possess substantial stiffness and permanency.

10. An embossed cellulosic fiber web according to claim 9, wherein said raised contoured portions of said sheet terminate at their outermost extremities in an annular edge defining an opening through said web.

11. A drying unit for a papermaking machine, comprising a moveable endless foraminous surface upon which a paper web to be dried is fed so as to leave one surface of said web exposed, hood means disposed adjacent at least a portion of said surface contacted by said paper web and adapted to substantially enclose said portion so as to form a drying zone, supply means for introducing gaseous fluid under pressure into said hood means, and vacuum bias means disposed adjacent said foraminous surface opposite the portion thereof contacted by said web and enclosed by said hood means, said vacuum bias means being adapted to draw gaseous fluid through said web while it is in contact with and supported by said surface in order to effect drying of said web.

12. A drying unit according to claim 11, including first means contacting the exposed surface of said web and adapted to press the web into contacting engagement with said surface along an initial line of contact between said web and said surface, and second means contacting the exposed surface of said web and adapted to press the web into contacting engagement with said surface along a second line of contact adjacent the removal point of said web, said second line being separated from said initial line by said drying zone in which the pressure hood and the vacuum bias means cooperate to create a pressure drop through the web so as to cause removal of moisture therefrom.

13. A drying unit according to claim 11, wherein said supply means include means for heating said gaseous fluid prior to its introduction into said hood means.

14. A drying unit according to claim 11, wherein said moveable endless foraminous surface is a foraminous cylindrical shell mounted for rotation about its central axis and said vacuum bias means are disposed on the interior of said shell.

15. A drying unit according to claim 14, wherein said moveable endless foraminous surface is a foraminous cylindrical shell mounted for rotation about its central axis and said vacuum bias means are disposed on the exterior of said shell adjacent the surface thereof, and arranged to operate through the openings in successive transverse segments of said shell during rotation thereof, which successive transverse segments have previously supported the web in the drying zone and have passed, during rotation, out of contact with said web.

16. A drying unit according to claim 14, including an endless flexible foraminous belt entrained over said cylindrical shell in at least partial wrapping engagement therewith.

17. A drying unit according to claim 15, including an endless flexible foraminous belt entrained over said cylindrical shell in at least partial wrapping engagement therewith.

18. A drying unit according to claim 11, wherein said moveable endless foraminous surface is an endless flexible foraminous belt entrained about a foraminous cylindrical shell mounted for rotation about its central axis, said vacuum bias means are disposed on the exterior of said shell adjacent the surface thereof, said supply means include means for heating said gaseous fluid prior to its introduction into said hood means, and including a plurality of cylindrical rolls rotatably mounted and disposed in spaced apart relation adjacent said shell, said endless flexible foraminous belt being entrained about said cylindrical shell and said cylindrical rolls in at least partial wrapping engagement therewith, means operably connected to said belt for moving it through an endless path over said rolls and said shell.

19. A drying unit according to claim 11, wherein said foraminous surface has openings therein arranged in a predetermined pattern and said unit includes means to force the cellulosic fibers in portions of said web covering said openings to shift their positions relative to one another prior to movement of said web through said drying zone so that said web portions are forced generally toward and into said openings at least partially out of the plane of said web and into the plane of said foraminous surface so as to form raised contoured portions in said web portions having substantial stiffness and permanency.

20. A drying unit according to claim 19, wherein said means include means to exert fluid pressure momentarily upon said web to cause the fibers thereof to shift their positions.

21. A drying unit according to claim 19, wherein said means are arranged to operate upon said web prior to movement of said web into said drying zone.

22. A drying unit according to claim 19, wherein said foraminous surface has a plurality of upstanding, projections in the portions thereof between said openings, and said fiber forcing means are adapted to force the fibers in portions of said web covering said projections to shift their positions relative to one another so that said web portions are forced upwardly out of the plane of said web and above the plane of said foraminous surface.

23. In a drying unit for a papermaking machine, having a movable endless foraminous carrying member having an undulating upper surface which is adapted to carry a wet paper web through a drying region, and drying means for passing a gaseous fluid through said web within said drying region for removing moisture from said web, the improvement comprising embossing means for initially simultaneously directing gaseous fluid at high velocity toward the side of said web spaced from said carrying member and applying a high vacuum to the side of said carrying member and spaced from said web, whereby said web is pressed into conformity with said undulating upper surface and retains its resulting shape when dried.

24. The improvement in a drying unit for a papermaking machine according to claim 23, wherein said embossing means include a nozzle disposed adjacent to but spaced from the side of said carrying member, said nozzle being adapted to direct a gaseous fluid at high velocity against successive transverse segments of said web as it is carried on said foraminous carrying member toward said drying region, a vacuum box disposed adjacent the opposite side of said carrying member and opposite said nozzle, said vacuum box being adapted to receive and remove substantially all of the gaseous fluid emitted by said nozzle which passes through said web.

25. The improvement in a drying unit for a papermaking machine according to claim 24, wherein siad gaseous fluid is air at an elevated temperature.

26. The improvement in a drying unit for a papermaking machine according to claim 24, wherein said gaseous fluid is steam.

27. The improvement in a drying unit for a papermaking machine according to claim 24, wherein said moveable endless foraminous carrying member comprises a woven wire cloth.

28. In a method for drying a wet paper web, in which the wet paper web is carried through a drying region upon a movable endless foraminous carrying member having an undulating upper surface while a gaseous fluid is passed through said web to remove moisture therefrom, the improvement comprising simultaneously directing gaseous fluid at high velocity against the side of said web spaced from said carrying member and creating a high vacuum adjacent the side of said carrying member spaced from said web, wherein said web is pressed into conformity with said undulating upper surface and retains its resulting shape when dried.

29. The improvement in a method for drying a wet paper web according to claim 28, wherein said high vacuum is created adjacent the side of said carrying member spaced from said web in a position substantially opposite the position toward which the gaseous fluid is directed, so that substantially all of the gaseous fluid directed against successive transverse segments of said web and passing through said web is received and withdrawn by said vacuum.

30. A drying unit for a papermaking machine, comprising:

a movable endless foraminous carrying member, means for pressing into contacting engagement with a portion of the surface of said carrying member a wet paper web to be dried while leaving one surface of said web exposed, hood means disposed adjacent at least a portion of the surface of said carrying member contacted by said paper web, said hood means being adapted to substantially enclose said portion so as to form a drying zone, supply means for introducing gaseous fluid into said hood means, and vacuum bias means adapted to draw said gaseous fluid successively through said paper web and said foraminous carrying member while said paper web is in contact with and supported by said surface so as to dry said web.

31. A drying unit according to claim 30, wherein said carrying member is a foraminous cylindrical shell.

32. A drying unit according to claim 30, wherein said carrying member is a foraminous woven wire belt.

33. A drying unit according to claim 30, wherein said carrying member is a foraminous woven wire belt entrained over a foraminous cylindrical shell.

34. A drying unit according to claim 30, wherein said vacuum bias means are disposed adjacent the portion of said carrying member supporting said web, and opposite the surface of said carrying member contacted by said web.

35. A drying unit according to claim 31, wherein said vacuum bias means are adapted to act through portions of said foraminous shell which have passed out of contact with said web.

36. A drying unit according to claim 33, wherein said vacuum bias means are adapted to act through portions of said cylindrical shell which have passed out of contact with portions of the wire supporting said web.

37. A drying unit according to claim 11, wherein said movable endless foraminous surface is an endless flexible foraminous belt entrained over a foraminous cylindrical shell.

* * * * *